(12) United States Patent
Zellner

(10) Patent No.: US 8,644,506 B2
(45) Date of Patent: Feb. 4, 2014

(54) LOCATION-BASED SECURITY RULES

(75) Inventor: Samuel Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 984 days.

(21) Appl. No.: 11/959,283

(22) Filed: Dec. 18, 2007

(65) Prior Publication Data

US 2008/0096529 A1    Apr. 24, 2008

Related U.S. Application Data

(63) Continuation of application No. 11/187,347, filed on Jul. 21, 2005, now Pat. No. 7,428,411, which is a continuation-in-part of application No. 09/739,340, filed on Dec. 19, 2000, now Pat. No. 7,116,977.

(51) Int. Cl.
*H04L 9/00*    (2006.01)
*H04M 3/00*    (2006.01)
*G06F 13/00*   (2006.01)
*H04B 7/00*    (2006.01)

(52) U.S. Cl.
USPC ..... 380/249; 455/404.2; 455/411; 455/414.3; 455/414.1; 455/415; 380/282; 725/2; 726/5; 726/7; 709/225; 709/242; 713/153; 705/40

(58) Field of Classification Search
USPC ............... 455/414.3, 419, 430, 456.1, 456.3, 455/404.2, 414.1, 415, 456.5; 380/249, 380/282; 726/2, 5, 7; 705/40; 713/153; 725/2; 709/225, 242
See application file for complete search history.

(56) References Cited

U.S. PATENT DOCUMENTS

| | | | |
|---|---|---|---|
| 4,445,118 A | 4/1984 | Taylor et al. | 342/357.09 |
| 4,757,267 A | 7/1988 | Riskin | 379/113 |
| 4,893,335 A | 1/1990 | Fuller et al. | |
| 5,127,042 A | 6/1992 | Gillig et al. | |
| 5,303,393 A | 4/1994 | Noreen et al. | 455/3.2 |
| 5,321,242 A | 6/1994 | Heath, Jr. | 235/382 |
| 5,375,161 A | 12/1994 | Fuller et al. | |
| 5,440,758 A | 8/1995 | Grube et al. | |
| 5,444,444 A | 8/1995 | Ross | |
| 5,451,757 A | 9/1995 | Heath, Jr. | 340/5.4 |
| 5,511,111 A | 4/1996 | Serbetcioglu et al. | 379/67 |
| 5,512,908 A | 4/1996 | Herrick | 342/387 |

(Continued)

FOREIGN PATENT DOCUMENTS

| | | |
|---|---|---|
| EP | 000964542 A2 | 12/1999 |
| JP | 1-194628 | 8/1989 |

(Continued)

OTHER PUBLICATIONS

U.S. Final Office Action dated Mar. 18, 2008 cited in U.S. Appl. No. 11/252,039.

(Continued)

*Primary Examiner* — William D Cumming
(74) *Attorney, Agent, or Firm* — Hartman & Citrin LLC

(57) ABSTRACT

Location based security rules are provided for preventing unauthorized access to a device, application, system, content, and/or network, etc. The location-based security rules enable a user, computing device, system, etc. to access the requested item or information when the user provides proper identification information. The proper identification information is based in part on the location of the user and/or the user's access request.

18 Claims, 10 Drawing Sheets

(56) References Cited

U.S. PATENT DOCUMENTS

| | | | |
|---|---|---|---|
| 5,528,248 A | 6/1996 | Steiner et al. ............. 342/357.06 |
| 5,544,222 A | 8/1996 | Robinson et al. |
| 5,566,235 A | 10/1996 | Hetz |
| 5,588,037 A | 12/1996 | Fuller et al. |
| 5,588,042 A | 12/1996 | Comer ............................ 379/59 |
| 5,596,625 A | 1/1997 | LeBlanc ......................... 379/60 |
| 5,610,970 A | 3/1997 | Fuller et al. |
| 5,610,973 A | 3/1997 | Comer ............................ 379/59 |
| 5,625,364 A | 4/1997 | Herrick et al. ................. 342/449 |
| 5,657,375 A | 8/1997 | Connolly et al. |
| 5,663,734 A | 9/1997 | Krasner |
| 5,673,299 A | 9/1997 | Fuller et al. |
| 5,694,453 A | 12/1997 | Fuller et al. .............. 340/825.49 |
| 5,696,815 A | 12/1997 | Smyk |
| 5,701,301 A | 12/1997 | Weisser, Jr. ................... 370/428 |
| 5,712,899 A | 1/1998 | Pace, II ........................... 379/58 |
| 5,713,075 A | 1/1998 | Threadgill et al. ............. 455/427 |
| 5,720,033 A | 2/1998 | Deo ................................... 726/2 |
| 5,727,057 A | 3/1998 | Emery et al. ................... 379/211 |
| 5,729,537 A | 3/1998 | Billstrom |
| 5,751,760 A | 5/1998 | Fuller et al. |
| 5,771,283 A | 6/1998 | Chang et al. ................... 379/142 |
| 5,790,953 A | 8/1998 | Wang et al. |
| 5,794,210 A | 8/1998 | Goldhaber et al. ............. 705/14 |
| 5,812,763 A | 9/1998 | Teng ................................ 726/25 |
| 5,819,155 A | 10/1998 | Worthy et al. ..................... 455/2 |
| 5,825,283 A | 10/1998 | Camhi |
| 5,825,775 A | 10/1998 | Chin et al. |
| 5,835,907 A | 11/1998 | Newman |
| 5,838,774 A | 11/1998 | Weisser, Jr. ................. 379/92.02 |
| 5,848,131 A | 12/1998 | Shaffer et al. |
| 5,852,775 A | 12/1998 | Hidary .......................... 455/404 |
| 5,875,401 A | 2/1999 | Rochkind ...................... 455/466 |
| 5,889,953 A | 3/1999 | Thebaut et al. ................ 709/221 |
| 5,903,636 A | 5/1999 | Malik |
| 5,949,865 A | 9/1999 | Fusinato |
| 5,949,867 A | 9/1999 | Sonnenberg |
| 5,959,577 A | 9/1999 | Fan et al. |
| 5,961,593 A | 10/1999 | Gabber et al. ................. 709/219 |
| 5,963,866 A | 10/1999 | Palamara et al. |
| 5,968,176 A | 10/1999 | Nessett et al. .................. 726/11 |
| 6,011,975 A | 1/2000 | Emery et al. |
| 6,021,126 A | 2/2000 | White et al. |
| 6,028,921 A | 2/2000 | Malik et al. ................... 379/201 |
| 6,047,327 A | 4/2000 | Tso et al. ....................... 709/232 |
| 6,055,637 A | 4/2000 | Hudson et al. .................. 726/20 |
| 6,060,993 A | 5/2000 | Cohen |
| 6,076,080 A | 6/2000 | Morscheck et al. ........... 705/400 |
| 6,085,086 A | 7/2000 | LaPorta et al. ................ 455/432 |
| 6,091,956 A | 7/2000 | Hollenberg .................. 455/456.5 |
| 6,101,381 A | 8/2000 | Tajima et al. .................. 455/414 |
| 6,112,186 A | 8/2000 | Bergh et al. ...................... 705/10 |
| 6,119,000 A | 9/2000 | Stephenson et al. |
| 6,122,520 A | 9/2000 | Want et al. ................... 455/456.2 |
| 6,133,853 A | 10/2000 | Obradovich et al. .......... 340/905 |
| 6,138,003 A | 10/2000 | Kingdon et al. ............... 455/410 |
| 6,138,119 A | 10/2000 | Hall et al. .......................... 707/9 |
| 6,157,829 A | 12/2000 | Grube et al. ................... 455/414 |
| 6,182,226 B1 | 1/2001 | Reid et al. ........................ 726/15 |
| 6,183,003 B1 | 2/2001 | Matsuhashi et al. |
| 6,184,829 B1 | 2/2001 | Stilp ............................... 342/387 |
| 6,185,426 B1 | 2/2001 | Alperovich et al. ........... 455/456 |
| 6,208,854 B1 | 3/2001 | Roberts et al. |
| 6,208,866 B1 | 3/2001 | Rouhollahzadeh et al. .. 455/456 |
| 6,229,477 B1 | 5/2001 | Chang et al. .............. 342/357.01 |
| 6,230,188 B1 | 5/2001 | Marcus |
| 6,233,329 B1 | 5/2001 | Urban et al. ................. 379/142.1 |
| 6,243,581 B1 | 6/2001 | Jawanda |
| 6,249,577 B1 | 6/2001 | Baldwin |
| 6,259,405 B1 | 7/2001 | Stewart et al. ................. 342/457 |
| 6,311,069 B1 | 10/2001 | Havinis et al. ................ 455/456 |
| 6,317,718 B1 | 11/2001 | Fano ................................. 705/1 |
| 6,321,092 B1 | 11/2001 | Fitch et al. ..................... 455/456 |
| 6,324,349 B2 | 11/2001 | Nakano et al. |
| 6,324,396 B1 | 11/2001 | Vasa et al. |
| 6,332,127 B1 | 12/2001 | Bandera et al. ................. 705/14 |
| 6,340,935 B1 | 1/2002 | Hall |
| 6,353,664 B1 | 3/2002 | Cannon et al. ............. 379/142.1 |
| 6,369,754 B1 | 4/2002 | Levanon |
| 6,374,246 B1 | 4/2002 | Matsuo |
| 6,377,810 B1 | 4/2002 | Geiger et al. .................. 455/456 |
| 6,381,465 B1 | 4/2002 | Chern et al. |
| 6,385,591 B1 | 5/2002 | Mankoff ......................... 705/14 |
| 6,404,876 B1 | 6/2002 | Smith et al. |
| 6,411,899 B2 | 6/2002 | Dussell et al. |
| 6,414,635 B1 | 7/2002 | Stewart et al. ................. 342/457 |
| 6,418,308 B1 | 7/2002 | Heinonen et al. ............. 455/414 |
| 6,421,411 B1 | 7/2002 | Hsieh |
| 6,421,441 B1 | 7/2002 | Dzuban ..................... 379/221.09 |
| 6,427,073 B1 | 7/2002 | Kortesalmi et al. ........ 455/414.1 |
| 6,442,391 B1 | 8/2002 | Johansson et al. ............ 455/456 |
| 6,442,687 B1 | 8/2002 | Savage .......................... 713/156 |
| 6,449,497 B1 | 9/2002 | Kirbas et al. .................. 455/564 |
| 6,463,533 B1 | 10/2002 | Calamera et al. ............. 713/163 |
| 6,466,862 B1 | 10/2002 | DeKock et al. |
| 6,470,378 B1 | 10/2002 | Tracton et al. ................ 709/203 |
| 6,470,447 B1 | 10/2002 | Lambert et al. |
| 6,473,626 B1 | 10/2002 | Nevoux et al. |
| 6,477,382 B1 | 11/2002 | Mansfield et al. ............. 455/458 |
| 6,484,148 B1 | 11/2002 | Boyd ............................... 705/14 |
| 6,491,217 B2 | 12/2002 | Catan |
| 6,496,931 B1 | 12/2002 | Rajchel et al. ................ 713/168 |
| 6,505,046 B1 | 1/2003 | Baker ............................ 455/456 |
| 6,505,048 B1 | 1/2003 | Moles et al. .................. 455/456 |
| 6,505,049 B1 | 1/2003 | Dorenbosch .................. 455/456 |
| 6,505,163 B1 | 1/2003 | Zhang et al. |
| 6,516,203 B1 | 2/2003 | Enzmann et al. |
| 6,519,530 B2 | 2/2003 | Crockett et al. |
| 6,522,876 B1 | 2/2003 | Weiland et al. ............... 455/414 |
| 6,526,275 B1 | 2/2003 | Calvert ......................... 455/418 |
| 6,526,506 B1 * | 2/2003 | Lewis ........................... 713/153 |
| 6,529,159 B1 | 3/2003 | Fan et al. |
| 6,545,596 B1 | 4/2003 | Moon ......................... 340/425.5 |
| 6,546,257 B1 | 4/2003 | Stewart .......................... 455/456 |
| 6,559,769 B2 | 5/2003 | Anthony et al. |
| 6,560,442 B1 | 5/2003 | Yost et al. ..................... 455/67.1 |
| 6,560,461 B1 | 5/2003 | Fomukong et al. ........... 455/456 |
| 6,574,548 B2 | 6/2003 | DeKock et al. |
| 6,590,885 B1 | 7/2003 | Jorgensen |
| 6,594,482 B1 | 7/2003 | Findikli et al. ................ 455/411 |
| 6,596,483 B1 | 7/2003 | Choong et al. |
| 6,614,781 B1 | 9/2003 | Elliott et al. |
| 6,618,474 B1 | 9/2003 | Reese ........................ 379/142.17 |
| 6,618,593 B1 | 9/2003 | Drutman et al. .............. 455/456 |
| 6,622,016 B1 | 9/2003 | Sladek et al. |
| 6,625,457 B1 | 9/2003 | Raith |
| 6,628,928 B1 | 9/2003 | Crosby et al. .................. 455/77 |
| 6,628,938 B1 | 9/2003 | Rachabathuni et al. ....... 455/414 |
| 6,640,184 B1 | 10/2003 | Rabe |
| 6,647,257 B2 | 11/2003 | Owensby .................... 455/414.1 |
| 6,647,269 B2 | 11/2003 | Hendrey et al. ............... 455/456 |
| 6,650,901 B1 | 11/2003 | Schuster et al. ............. 455/456.1 |
| 6,654,607 B1 | 11/2003 | Shobatake et al. |
| 6,662,014 B1 | 12/2003 | Walsh ......................... 455/456.2 |
| 6,675,017 B1 | 1/2004 | Zellner et al. ................. 455/456 |
| 6,677,894 B2 | 1/2004 | Sheynblat et al. .......... 342/357.1 |
| 6,678,265 B1 | 1/2004 | Kung et al. |
| 6,701,160 B1 | 3/2004 | Pinder et al. ................ 455/550.1 |
| 6,711,474 B1 | 3/2004 | Treyz et al. |
| 6,716,101 B1 | 4/2004 | Meadows et al. .......... 455/456.1 |
| 6,725,048 B2 | 4/2004 | Mao et al. ................... 455/456.2 |
| 6,732,101 B1 | 5/2004 | Cook .............................. 707/10 |
| 6,738,808 B1 | 5/2004 | Zellner et al. ................. 709/223 |
| 6,748,217 B1 | 6/2004 | Hunzinger et al. |
| 6,754,504 B1 | 6/2004 | Reed |
| 6,779,020 B1 | 8/2004 | Henrick |
| 6,782,259 B2 | 8/2004 | Bamburak et al. |
| 6,799,049 B1 | 9/2004 | Zellner et al. .............. 455/456.1 |
| 6,816,720 B2 | 11/2004 | Hussain et al. ............. 455/404.2 |
| 6,819,929 B2 | 11/2004 | Antonucci et al. ............ 455/445 |
| 6,826,414 B1 | 11/2004 | Reynolds et al. |
| 6,829,475 B1 | 12/2004 | Lee et al. ....................... 455/419 |
| 6,834,050 B1 | 12/2004 | Madour et al. |
| 6,834,341 B1 | 12/2004 | Bahl et al. |

(56) References Cited

U.S. PATENT DOCUMENTS

| | | | |
|---|---|---|---|
| 6,850,758 B1 | 2/2005 | Paul et al. | |
| 6,867,733 B2 | 3/2005 | Sandhu et al. | 342/357.07 |
| 6,868,074 B1 | 3/2005 | Hanson | 370/328 |
| 6,874,011 B1 | 3/2005 | Spielman et al. | 709/206 |
| 6,876,858 B1 | 4/2005 | Duvall et al. | 455/456.1 |
| 6,879,584 B2 | 4/2005 | Thro et al. | |
| 6,882,641 B1 | 4/2005 | Gallick et al. | |
| 6,898,433 B1 | 5/2005 | Rajaniemi et al. | |
| 6,934,558 B1 | 8/2005 | Sainton et al. | |
| 6,937,869 B1 | 8/2005 | Rayburn | 455/457 |
| 6,940,950 B2 | 9/2005 | Dickinson et al. | |
| 6,954,147 B1 | 10/2005 | Cromer et al. | 340/568.1 |
| 6,954,526 B1 | 10/2005 | Glenn et al. | |
| 6,954,649 B2 | 10/2005 | Kotzin | |
| 6,961,583 B2 | 11/2005 | Moles et al. | |
| 6,961,584 B2 | 11/2005 | Leedom, Jr. | |
| 6,963,557 B2 | 11/2005 | Knox | |
| 6,975,874 B1 | 12/2005 | Bates et al. | |
| 6,996,211 B2 | 2/2006 | Reynolds et al. | |
| 6,999,779 B1 | 2/2006 | Hashimoto | |
| 7,005,985 B1 | 2/2006 | Steeves | 340/572.1 |
| 7,023,995 B2 | 4/2006 | Olsson | 380/258 |
| 7,039,431 B2 | 5/2006 | Mukherjee | |
| 7,043,231 B2 | 5/2006 | Bhatia et al. | 455/412.1 |
| 7,051,196 B2 | 5/2006 | Angelo et al. | |
| 7,069,319 B2 | 6/2006 | Zellner et al. | |
| 7,079,627 B2 | 7/2006 | Crago et al. | |
| 7,085,555 B2 | 8/2006 | Zellner et al. | |
| 7,085,578 B2 | 8/2006 | Barclay et al. | |
| 7,093,286 B1 | 8/2006 | King | |
| 7,103,368 B2 | 9/2006 | Teshima | 455/456.3 |
| 7,103,460 B1 | 9/2006 | Breed | |
| 7,106,843 B1 | 9/2006 | Gainsboro et al. | 379/191 |
| 7,110,749 B2 | 9/2006 | Zellner et al. | |
| 7,116,977 B1* | 10/2006 | Moton et al. | 455/419 |
| 7,123,693 B2 | 10/2006 | Nelson et al. | |
| 7,124,101 B1 | 10/2006 | Mikurak | 705/35 |
| 7,130,630 B1 | 10/2006 | Enzmann et al. | |
| 7,181,017 B1* | 2/2007 | Nagel et al. | 380/282 |
| 7,181,225 B1 | 2/2007 | Moton et al. | |
| 7,181,529 B2 | 2/2007 | Bhatia et al. | 709/238 |
| 7,190,960 B2 | 3/2007 | Wilson et al. | |
| 7,203,502 B2 | 4/2007 | Wilson et al. | |
| 7,212,829 B1 | 5/2007 | Lau et al. | 455/456.1 |
| 7,224,978 B2 | 5/2007 | Zellner et al. | |
| 7,224,987 B1 | 5/2007 | Bhela et al. | |
| 7,236,799 B2 | 6/2007 | Wilson et al. | |
| 7,245,925 B2* | 7/2007 | Zellner | 455/456.1 |
| 7,260,186 B2 | 8/2007 | Zhu et al. | |
| 7,260,378 B2 | 8/2007 | Holland et al. | 455/404.2 |
| 7,284,232 B1 | 10/2007 | Bates et al. | |
| 7,299,034 B2* | 11/2007 | Kates | 455/415 |
| 7,305,350 B1 | 12/2007 | Bruecken | |
| 7,330,464 B2 | 2/2008 | Brouwer et al. | |
| 7,366,522 B2 | 4/2008 | Thomas | |
| 7,383,052 B2* | 6/2008 | Moton et al. | 455/456.2 |
| 7,412,234 B2* | 8/2008 | Zellner | 455/456.3 |
| 7,418,503 B2* | 8/2008 | Zellner et al. | 709/225 |
| 7,428,411 B2* | 9/2008 | Zellner | 455/419 |
| 7,433,673 B1 | 10/2008 | Everson et al. | |
| 7,509,133 B2* | 3/2009 | Zellner et al. | 455/456.1 |
| 7,529,359 B2 | 5/2009 | Gallant et al. | |
| 7,552,467 B2* | 6/2009 | Lindsay | 726/5 |
| 7,593,712 B2* | 9/2009 | Moton et al. | 455/404.2 |
| 7,603,110 B2* | 10/2009 | Zellner et al. | 455/414.1 |
| 7,606,938 B2* | 10/2009 | Roese et al. | 709/242 |
| 7,636,575 B2* | 12/2009 | Enzmann et al. | 455/456.5 |
| 7,664,488 B2 | 2/2010 | Zellner et al. | |
| 7,664,509 B2* | 2/2010 | Zellner et al. | 455/456.1 |
| 7,668,537 B2 | 2/2010 | De Vries | |
| 7,680,590 B2* | 3/2010 | Sanqunetti | 701/516 |
| 7,685,629 B1* | 3/2010 | White et al. | 726/2 |
| 7,796,998 B1* | 9/2010 | Zellner et al. | 455/456.1 |
| 7,844,284 B2 | 11/2010 | Enzmann et al. | |
| 7,873,369 B2 | 1/2011 | Zellner et al. | |
| 7,894,801 B2 | 2/2011 | Zellner et al. | |
| 7,941,130 B2 | 5/2011 | Moton et al. | |
| 7,966,026 B2 | 6/2011 | Zellner et al. | |
| 8,010,126 B2 | 8/2011 | Moton et al. | |
| 8,041,817 B2 | 10/2011 | Zellner et al. | |
| 8,064,930 B2 | 11/2011 | Enzmann et al. | |
| 8,086,224 B2 | 12/2011 | Zellner et al. | |
| 8,165,568 B2 | 4/2012 | Zellner et al. | |
| 8,185,130 B2 | 5/2012 | Zellner et al. | |
| 8,494,501 B2 | 7/2013 | Zellner et al. | |
| 2001/0021646 A1 | 9/2001 | Antonucci et al. | |
| 2001/0034709 A1 | 10/2001 | Stoifo et al. | 705/51 |
| 2002/0035605 A1 | 3/2002 | McDowell et al. | |
| 2002/0035699 A1 | 3/2002 | Crosbie | |
| 2002/0037709 A1 | 3/2002 | Bhatia et al. | 455/414 |
| 2002/0037722 A1 | 3/2002 | Hussain et al. | 455/435 |
| 2002/0037731 A1 | 3/2002 | Mao et al. | 455/453 |
| 2002/0037744 A1 | 3/2002 | Bhatia et al. | 455/557 |
| 2002/0037750 A1 | 3/2002 | Hussain et al. | 455/564 |
| 2002/0038362 A1 | 3/2002 | Bhatia et al. | 709/224 |
| 2002/0038386 A1 | 3/2002 | Bhatia et al. | 709/250 |
| 2002/0052781 A1 | 5/2002 | Aufricht et al. | |
| 2002/0070879 A1 | 6/2002 | Gazit et al. | |
| 2002/0077083 A1 | 6/2002 | Zellner et al. | |
| 2002/0077084 A1 | 6/2002 | Zellner et al. | |
| 2002/0077118 A1 | 6/2002 | Zellner et al. | |
| 2002/0077130 A1 | 6/2002 | Owensby | 455/466 |
| 2002/0077897 A1 | 6/2002 | Zellner et al. | |
| 2002/0077987 A1 | 6/2002 | Hasegawa et al. | |
| 2002/0090932 A1 | 7/2002 | Bhatia et al. | 455/412 |
| 2002/0095312 A1 | 7/2002 | Wheat | 705/1 |
| 2002/0102993 A1 | 8/2002 | Hendrey et al. | |
| 2002/0107027 A1 | 8/2002 | O'Neil | |
| 2002/0173317 A1 | 11/2002 | Nykanen et al. | |
| 2003/0046405 A1 | 3/2003 | O'Neill et al. | |
| 2003/0109245 A1 | 6/2003 | McCalmont et al. | |
| 2003/0195698 A1 | 10/2003 | Jones | |
| 2003/0229592 A1 | 12/2003 | Florance et al. | |
| 2004/0097243 A1 | 5/2004 | Zellner et al. | |
| 2004/0203900 A1 | 10/2004 | Cedervall et al. | |
| 2004/0203903 A1 | 10/2004 | Wilson et al. | |
| 2004/0205198 A1 | 10/2004 | Zellner et al. | |
| 2005/0272445 A1 | 12/2005 | Zellner et al. | |
| 2006/0030335 A1 | 2/2006 | Zellner et al. | |
| 2006/0030339 A1 | 2/2006 | Zhovnirovsky et al. | |
| 2006/0089134 A1 | 4/2006 | Moton et al. | 455/418 |
| 2006/0094447 A1 | 5/2006 | Zellner et al. | |
| 2006/0099966 A1 | 5/2006 | Moton et al. | 455/456.3 |
| 2006/0105784 A1 | 5/2006 | Zellner et al. | |
| 2006/0167986 A1 | 7/2006 | Trzyna et al. | 709/203 |
| 2006/0189327 A1 | 8/2006 | Zellner et al. | |
| 2006/0195570 A1 | 8/2006 | Zellner et al. | |
| 2007/0010260 A1* | 1/2007 | Zellner | 455/456.1 |
| 2007/0015495 A1 | 1/2007 | Winter et al. | |
| 2007/0027621 A1 | 2/2007 | Operowsky et al. | |
| 2007/0042789 A1* | 2/2007 | Moton et al. | 455/456.1 |
| 2007/0047523 A1 | 3/2007 | Jiang | |
| 2007/0063875 A1 | 3/2007 | Hoffberg | |
| 2007/0105565 A1 | 5/2007 | Enzmann et al. | |
| 2007/0124721 A1 | 5/2007 | Cowing et al. | |
| 2007/0136603 A1 | 6/2007 | Kuecuekyan | 713/185 |
| 2007/0142060 A1 | 6/2007 | Moton et al. | |
| 2007/0250920 A1* | 10/2007 | Lindsay | 726/7 |
| 2008/0096529 A1* | 4/2008 | Zellner | 455/411 |
| 2008/0132252 A1 | 6/2008 | Altman et al. | |
| 2008/0261571 A1 | 10/2008 | Zellner et al. | |
| 2008/0261624 A1* | 10/2008 | Moton et al. | 455/456.2 |
| 2008/0299957 A1* | 12/2008 | Zellner | 455/414.3 |
| 2009/0047937 A1 | 2/2009 | Zellner et al. | |
| 2009/0259588 A1* | 10/2009 | Lindsay | 705/40 |
| 2009/0325551 A1 | 12/2009 | Zellner et al. | |
| 2010/0035636 A1 | 2/2010 | Enzmann et al. | |
| 2010/0105417 A1 | 4/2010 | Zellner et al. | |
| 2010/0131584 A1 | 5/2010 | Johnson | |
| 2010/0151815 A1 | 6/2010 | Zellner et al. | |
| 2010/0296510 A1 | 11/2010 | Zellner | |
| 2011/0047179 A1 | 2/2011 | Enzmann et al. | |
| 2011/0143708 A1 | 6/2011 | Zellner et al. | |
| 2011/0312341 A1 | 12/2011 | Moton et al. | |

(56) References Cited

U.S. PATENT DOCUMENTS

| | | | |
|---|---|---|---|
| 2012/0034930 A1 | 2/2012 | Zellner et al. |
| 2012/0052843 A1 | 3/2012 | Enzmann et al. |
| 2012/0123869 A1 | 5/2012 | Zellner et al. |
| 2012/0196572 A1 | 8/2012 | Zellner et al. |
| 2012/0264452 A1 | 10/2012 | Zellner et al. |
| 2012/0276873 A1 | 11/2012 | Zellner et al. |
| 2012/0289251 A1 | 11/2012 | Moton et al. |

FOREIGN PATENT DOCUMENTS

| | | |
|---|---|---|
| JP | 3-126540 | 5/1991 |
| JP | 3-128540 | 5/1991 |
| JP | 7-234789 | 9/1995 |
| JP | 7-288514 | 10/1995 |
| JP | 7-319706 | 12/1995 |
| JP | 8-44568 | 2/1996 |
| JP | 8-87296 | 4/1996 |
| WO | WO 98/19484 | 5/1998 |
| WO | WO 99/27716 | 6/1999 |
| WO | PCT/US01/22295 | 7/2001 |
| WO | 02/11407 | 2/2002 |

OTHER PUBLICATIONS

U.S. Final Office Action dated Apr. 3, 2008 cited in U.S. Appl. No. 11/589,688.
U.S. Final Office Action dated Apr. 29, 2008 cited in U.S. Appl. No. 09/630,134.
U.S. Office Action dated May 13, 2008 cited in U.S. Appl. No. 11/298,419.
Copending U.S. Appl. No. 12/132,104, filed Jun. 3, 2008 entitled "System and Method for Using Location Information to Execute an Action".
"Wireless Application Protocol," Oct. 1999, Wireless Internet Today, pp. 1-20.
Mark Moeglein et al., "An Introduction to Snap Track Server-Aided GPS Technology," available at http://www.snaptrack.com/atwork.html.
"Signal Soft Wireless Location Services," available at http://www.signalsoftcorp.com/products/location_manager.html.
Co-pending U.S. Appl. No. 09/739,315, filed Dec. 19, 2000.
Co-pending U.S. Appl. No. 09/630,134, filed Aug. 1, 2000.
Co-pending U.S. Appl. No. 09/739,162, filed Dec. 19, 2000.
Co-pending U.S. Appl. No. 10/704,775, filed Nov. 12, 2003.
Co-pending U.S. Appl. No. 10/819,940, filed Apr. 8, 2004.
Co-pending U.S. Appl. No. 09/740,414, filed Dec. 19, 2000.
Co-pending U.S. Appl. No. 09/740,372, filed Dec. 19, 2000.
U.S. Official Action dated Nov. 10, 2003 cited in U.S. Appl. No. 09/740,414.
U.S. Final Official Action dated Apr. 21, 2004 cited in U.S. Appl. No. 09/740,414.
U.S. Official Action dated Oct. 5, 2004 cited in U.S. Appl. No. 09/740,414.
U.S. Official Action dated Jun. 21, 2004 cited in U.S. Appl. No. 09/739,315.
U.S. Final Official Action dated Feb. 9, 2005 cited in U.S. Appl. No. 09/739,315.
U.S. Official Action dated Nov. 10, 2003 cited in U.S. Appl. No. 09/739,162.
U.S. Official Action dated Mar. 9, 2004 cited in U.S. Appl. No. 09/739,162.
U.S. Official Action dated Sep. 9, 2004 cited in U.S. Appl. No. 09/739,162.
U.S. Official Action dated Feb. 12, 2003 cited in U.S. Appl. No. 09/630,134.
U.S. Final Official Action dated Jul. 10, 2003 cited in U.S. Appl. No. 09/630,134.
U.S. Official Action dated Jun. 7, 2004 cited in U.S. Appl. No. 09/630,134.
U.S. Official Action dated Jan. 13, 2005 cited in U.S. Appl. No. 09/630,134.
U.S. Official Action dated May 16, 2003 cited in U.S. Appl. No. 09/740,372.
U.S. Official Action dated Oct. 30, 2003 cited in U.S. Appl. No. 09/740,372.
U.S. Official Action dated Apr. 15, 2004 cited in U.S. Appl. No. 09/740,372.
U.S. Final Official Action dated Nov. 2, 2004 cited in U.S. Appl. No. 09/740,372.
Microsoft Mobility Developer Conference 2003.
$3^{rd}$ Generation Partnership Project; Technical Specification Group Services and System Aspects; Functional Stage 2 Description of Location Services in UMTS (1999).
http://www.openwave.com/us/news_room/press_releases/2001/20010320 "Open Wave Announces Availability to End-to-End Set of Location Services for Wireless Internet".
U.S. Official Action dated Jul. 26, 2005 in U.S. Appl. No. 09/740,414.
U.S. Official Action dated Aug. 30, 2005 in U.S. Appl. No. 10/704,775.
U.S. Official Action dated Oct. 4, 2005 in U.S. Appl. No. 10/819,940.
Co-pending U.S. Appl. No. 11/252,039, filed Oct. 17, 2005.
U.S. Official Action dated Mar. 1, 2004 cited in U.S. Appl. No. 09/740,375.
U.S. Final Official Action dated Sep. 24, 2004 cited in U.S. Appl. No. 09/740,375.
U.S. Official Action dated Feb. 28, 2005 cited in U.S. Appl. No. 09/740,375.
U.S. Final Official Action dated Jul. 26, 2005 cited in U.S. Appl. No. 09/740,375.
Petronis, Scott, "Mapping Technology: The Common Thread," Wireless Review, vol. 17, No. 3, pp. 10-14, Feb. 1, 2000, ISSN: 1099-9248.
U.S. Official Action dated May 7, 2003 cited in U.S. Appl. No. 09/740,373.
U.S. Final Official Action dated Oct. 21, 2003 cited in U.S. Appl. No. 09/740,373.
U.S. Official Action dated Jan. 26, 2004 cited in U.S. Appl. No. 09/740,373.
U.S. Official Action dated Apr. 28, 2005 cited in U.S. Appl. No. 09/740,373.
U.S. Official Action dated Nov. 21, 2005 cited in U.S. Appl. No. 09/740,414.
U.S. Official Action dated Dec. 13, 2005 cited in U.S. Appl. No. 09/740,372.
U.S. Official Action dated Feb. 3, 2006 cited in U.S. Appl. No. 09/739,315.
U.S. Final Official Action dated Feb. 24, 2006 cited in U.S. Appl. No. 09/630,134.
U.S. Official Action dated Mar. 10, 2006 cited in U.S. Appl. No. 11/252,039.
U.S. Official Action dated Apr. 21, 2006 cited in U.S. Appl. No. 11/322,531.
U.S. Official Action dated Sep. 6, 2006 cited in U.S. Appl. No. 09/630,134.
U.S. Appl. No. 11/589,688, filed Oct. 30, 2006, entitled "Location Query Service for Wireless Networks".
U.S. Appl. No. 09/739,340, filed Dec. 19, 2000, entitled "System and Method for Using Location Information to Execute an Action".
U.S. Appl. No. 11/516,164, filed Sep. 6, 2006, entitled "System and Method for Using Location Information to Execute an Action".
U.S. Appl. No. 11/528,782, filed Sep. 28, 2006, entitled "System and Method for Using Location Information to Execute an Action".
U.S. Appl. No. 11/298,419, filed Dec. 9, 2005, entitled "System and Method for Using Location Information to Execute an Action".
U.S. Appl. No. 11/298,149, filed Dec. 9, 2005, entitled "System and Method for Using Location Information to Execute an Action".
U.S. Appl. No. 11/522,239, filed Sep. 15, 2006, entitled "System and Method for Using Location Information to Execute an Action".
U.S. Appl. No. 11/300,694, filed Dec. 15, 2005, entitled "System and Method for Using Location Information to Execute an Action".
U.S. Appl. No. 11/375,849, filed Mar. 15, 2006, entitled "Anonymous Location Service for Wireless Networks".

(56) References Cited

OTHER PUBLICATIONS

U.S. Appl. No. 11/406,881, filed Apr. 19, 2006, entitled "Location Blocking Service from a Wireless Service Provider".
U.S. Appl. No. 11/322,531, filed Dec. 30, 2005, entitled "Location Blocking Service from a Web Advertiser".
U.S. Appl. No. 09/740,375, filed Dec. 19, 2000, entitled "Identity Blocking Service from a Web Advertiser".
U.S. Office Action dated Mar. 12, 2004 cited in U.S. Appl. No. 09/739,340.
U.S. Office Action dated Dec. 10, 2004 cited in U.S. Appl. No. 09/739,340.
U.S. Office Action dated Apr. 22, 2005 cited in U.S. Appl. No. 09/739,340.
U.S. Final Office Action dated Apr. 8, 2005 cited in U.S. Appl. No. 09/739,162.
U.S. Office Action dated Jun. 7, 2005 cited in U.S. Appl. No. 09/630,134.
U.S. Office Action dated Dec. 19, 2005 cited in U.S. Appl. No. 09/740,375.
U.S. Office Action dated Feb. 6, 2006 cited in U.S. Appl. No. 09/740,375.
U.S. Final Office Action dated May 19, 2006 cited in U.S. Appl. No. 09/740,375.
U.S. Office Action dated Oct. 5, 2006 cited in U.S. Appl. No. 11/298,149.
U.S. Office Action dated Dec. 15, 2006 cited in U.S. Appl. No. 11/522,239.
BellSouth "The Real Yellow Pages," Greater Atlanta A-L, 2004 BellSouth Advertising & Publishing Corp.
BellSouth "The Real Yellow Pages," Greater Atlanta M-Z, 2004 BellSouth Advertising & Publishing Corp.
U.S. Office Action dated Jan. 9, 2007 cited in U.S. Appl. No. 11/406,881.
U.S. Final Office Action dated Jan. 11, 2007 cited in U.S. Appl. No. 11/322,531.
U.S. Final Office Action dated Feb. 6, 2007 cited in U.S. Appl. No. 11/252,039.
U.S. Final Office Action dated Apr. 2, 2007 cited in U.S. Appl. No. 09/630,134.
U.S. Office Action dated Apr. 6, 2007 cited in U.S. Appl. No. 11/298,419.
U.S. Final Office Action dated Jul. 19, 2007 cited in U.S. Appl. No. 11/298,149.
U.S. Final Office Action dated Sep. 10, 2007 cited in U.S. Appl. No. 11/522,239.
U.S. Copending U.S. Appl. No. 11/637,369, filed Dec. 12, 2006, entitled "Surveying Wireless Device Users by Location".
U.S. Office Action dated Sep. 12, 2007 cited in U.S. Appl. No. 11/406,881.
U.S. Office Action dated Sep. 13, 2007 cited in U.S. Appl. No. 11/252,039.
U.S. Final Office Action dated Nov. 15, 2007 in U.S. Appl. No. 11/298,419.
U.S. Office Action dated Oct. 16, 2007 in U.S. Appl. No. 09/630,134.
U.S. Office Action dated Nov. 13, 2008 in U.S. Appl. No. 09/630,134.
U.S. Office Action dated May 12, 2009 in U.S. Appl. No. 09/630,134.
U.S. Office Action dated Sep. 29, 2009 in U.S. Appl. No. 09/630,134.
U.S. Notice of Allowance dated May 27, 2010 in U.S. Appl. No. 09/630,134.
U.S. Notice of Allowance dated Aug. 30, 2006 in U.S. Appl. No. 09/739,315.
U.S. Notice of Allowance dated Apr. 10, 2006 in U.S. Appl. No. 09/739,340.
U.S. Notice of Allowance dated Jun. 24, 2005 in U.S. Appl. No. 09/740,372.
U.S. Notice of Allowance dated Jan. 27, 2006 in U.S. Appl. No. 09/740,372.
U.S. Notice of Allowance dated Sep. 13, 2005 in U.S. Appl. No. 09/740,373.
U.S. Notice of Allowance dated Nov. 7, 2005 in U.S. Appl. No. 09/739,162.
U.S. Notice of Allowance dated Mar. 7, 2006 in U.S. Appl. No. 09/740,414.
U.S. Office Action dated Jan. 9, 2006 in U.S. Appl. No. 10/704,775.
U.S. Office Action dated May 29, 2009 in U.S. Appl. No. 10/704,775.
U.S. Notice of Allowance dated Oct. 16, 2009 in U.S. Appl. No. 10/704,775.
U.S. Notice of Allowance dated Feb. 10, 2006 in U.S. Appl. No. 10/819,940.
U.S. Office Action dated Jan. 16, 2007 in U.S. Appl. No. 11/187,347.
U.S. Office Action dated Jun. 13, 2007 in U.S. Appl. No. 11/187,347.
U.S. Office Action dated Oct. 5, 2007 in U.S. Appl. No. 11/187,347.
U.S. Notice of Allowance dated May 6, 2008 in U.S. Appl. No. 11/187,347.
U.S. Notice of Allowance dated Jun. 15, 2009 in U.S. Appl. No. 11/252,039.
U.S. Notice of Allowance dated Dec. 26, 2007 in U.S. Appl. No. 11/298,149.
U.S. Office Action dated Nov. 14, 2008 in U.S. Appl. No. 11/298,419.
U.S. Notice of Allowance dated May 26, 2009 in U.S. Appl. No. 11/298,419.
U.S. Notice of Allowance dated Feb. 23, 2007 in U.S. Appl. No. 11/300,694.
U.S. Office Action dated Mar. 27, 2007 in U.S. Appl. No. 11/322,531.
U.S. Office Action dated Dec. 4, 2007 in U.S. Appl. No. 11/322,531.
U.S. Office Action dated Jul. 23, 2008 in U.S. Appl. No. 11/322,531.
U.S. Office Action dated Jan. 21, 2009 in U.S. Appl. No. 11/322,531.
U.S. Office Action dated Jun. 22, 2009 in U.S. Appl. No. 11/322,531.
U.S. Notice of Allowance dated Dec. 15, 2009 in U.S. Appl. No. 11/322,531.
U.S. Office Action dated Jul. 13, 2009 in U.S. Appl. No. 11/637,369.
U.S. Office Action dated Mar. 21, 2011 in U.S. Appl. No. 11/637,369.
U.S. Notice of Allowance dated Apr. 29, 2011 in U.S. Appl. No. 11/637,369.
U.S. Office Action dated Nov. 27, 2007 in U.S. Appl. No. 11/375,849.
U.S. Notice of Allowance dated Apr. 22, 2008 in U.S. Appl. No. 11/375,849.
U.S. Notice of Allowance dated Feb. 13, 2008 in U.S. Appl. No. 11/406,881.
U.S. Notice of Allowance dated Mar. 20, 2008 in U.S. Appl. No. 11/522,239.
U.S. Office Action dated Dec. 31, 2007 in U.S. Appl. No. 11/528,782.
U.S. Office Action dated Oct. 8, 2008 in U.S. Appl. No. 11/528,782.
U.S. Office Action dated Jan. 12, 2009 in U.S. Appl. No. 11/528,782.
U.S. Office Action dated Jun. 3, 2009 in U.S. Appl. No. 11/528,782.
U.S. Office Action dated Nov. 19, 2009 in U.S. Appl. No. 11/528,782.
U.S. Office Action dated Jul. 9, 2010 in U.S. Appl. No. 11/528,782.
U.S. Notice of Allowance dated Jan. 13, 2011 in U.S. Appl. No. 11/528,782.
U.S. Office Action dated Sep. 25, 2007 in U.S. Appl. No. 11/589,688.
U.S. Office Action dated Apr. 29, 2009 in U.S. Appl. No. 11/589,688.
U.S. Notice of Allowance dated Oct. 6, 2009 in U.S. Appl. No. 11/589,688.
U.S. Office Action dated Nov. 23, 2010 in U.S. Appl. No. 11/847,278.
U.S. Notice of Allowance dated Mar. 2, 2011 in U.S. Appl. No. 11/847,278.
U.S. Office Action dated Oct. 27, 2010 in U.S. Appl. No. 12/132,104.
U.S. Office Action dated May 19, 2011 in U.S. Appl. No. 12/132,104.
U.S. Office Action dated Aug. 26, 2011 in U.S. Appl. No. 12/132,104.
U.S. Notice of Allowance dated Apr. 20, 2012 in U.S. Appl. No. 12/132,104.
U.S. Office Action dated Apr. 28, 2010 in U.S. Appl. No. 12/164,307.
U.S. Office Action dated Oct. 13, 2010 in U.S. Appl. No. 12/164,307.
U.S. Office Action dated Jun. 8, 2011 in U.S. Appl. No. 12/164,307.
U.S. Notice of Allowance dated Jan. 20, 2012 in U.S. Appl. No. 12/164,307.
U.S. Office Action dated Jan. 11, 2011 in U.S. Appl. No. 12/188,375.
U.S. Office Action dated Aug. 25, 2011 in U.S. Appl. No. 12/188,375.
U.S. Notice of Allowance dated Mar. 20, 2012 in U.S. Appl. No. 12/188,375.
U.S. Office Action dated Oct. 25, 2010 in U.S. Appl. No. 12/198,346.
U.S. Office Action dated Mar. 16, 2011 in U.S. Appl. No. 12/198,346.

(56) References Cited

OTHER PUBLICATIONS

U.S. Notice of Allowance dated Jun. 6, 2011 in U.S. Appl. No. 12/198,346.
U.S. Office Action dated Jul. 27, 2010 in U.S. Appl. No. 12/552,767.
U.S. Notice of Allowance dated Oct. 10, 2010 in U.S. Appl. No. 12/552,767.
U.S. Office Action dated Mar. 29, 2010 in U.S. Appl. No. 12/580,616.
U.S. Notice of Allowance dated Sep. 16, 2010 in U.S. Appl. No. 12/580,616.
U.S. Office Action dated Jun. 1, 2010 in U.S. Appl. No. 12/648,424.
U.S. Notice of Allowance dated Sep. 21, 2010 in U.S. Appl. No. 12/648,424.
U.S. Office Action dated Aug. 24, 2010 in U.S. Appl. No. 12/650,488.
U.S. Office Action dated Dec. 14, 2010 in U.S. Appl. No. 12/650,488.
U.S. Office Action dated Mar. 23, 2011 in U.S. Appl. No. 12/650,488.
U.S. Notice of Allowance dated Aug. 17, 2011 in U.S. Appl. No. 12/650,488.
U.S. Office Action dated Mar. 30, 2011 in U.S. Appl. No. 12/909,401.
U.S. Notice of Allowance dated Jul. 15, 2011 in U.S. Appl. No. 12/909,401.
U.S. Office Action dated Jul. 11, 2011 in U.S. Appl. No. 13/031,721.
U.S. Notice of Allowance dated Dec. 23, 2011 in U.S. Appl. No. 13/031,721.
U.S. Office Action dated Oct. 28, 2011 in U.S. Appl. No. 13/195,086.
U.S. Notice of Allowance dated Jun. 28, 2012 in U.S. Appl. No. 13/195,086.
U.S. Office Action dated Oct. 10, 2012 in U.S. Appl. No. 13/195,086.
U.S. Office Action dated Apr. 12, 2012 in U.S. Appl. No. 13/246,193.
U.S. Office Action dated Jul. 25, 2012 in U.S. Appl. No. 13/246,193.
U.S. Office Action dated Feb. 23, 2012 in U.S. Appl. No. 13/289,297.
U.S. Office Action dated Jun. 13, 2012 in U.S. Appl. No. 13/289,297.
U.S. Office Action dated Mar. 12, 2012 in U.S. Appl. No. 13/297,137.
U.S. Office Action dated Jun. 26, 2012 in U.S. Appl. No. 13/297,137.
U.S. Notice of Allowance dated Oct. 11, 2012 in U.S. Appl. No. 13/297,137.
U.S. Office Action dated Jul. 3, 2012 in U.S. Appl. No. 13/437,076.
U.S. Office Action dated Jul. 31, 2012 in U.S. Appl. No. 13/461,942.
International Search Report & Written Opinion dated Aug. 1, 2002 in PCT Application No. PCT/US01/22295.
U.S. Notice of Allowance dated Dec. 14, 2005 in U.S. Appl. No. 09/740,373.
U.S. Office Action dated Dec. 17, 2010 in U.S. Appl. No. 09/740,375.
U.S. Office Action dated Apr. 4, 2011 in U.S. Appl. No. 09/740,375.
U.S. Office Action dated Dec. 19, 2012 in U.S. Appl. No. 09/740,375.
U.S. Office Action dated Nov. 27, 2012 in U.S. Appl. No. 12/188,375.
U.S. Notice of Allowance dated Nov. 8, 2012 in U.S. Appl. No. 13/246,193.
U.S. Office Action dated Nov. 26, 2012 in U.S. Appl. No. 13/289,297.
U.S. Notice of Allowance dated Nov. 28, 2012 in U.S. Appl. No. 13/437,076.
U.S. Official Action mailed on Apr. 11, 2013 in U.S. Appl. No. 09/740,375.
U.S. Official Action mailed on Apr. 29, 2013 in U.S. Appl. No. 13/555,239.
U.S. Official Action mailed on Apr. 30, 2013 in U.S. Appl. No. 13/778,264.
U.S. Official Action mailed on May 15, 2013 in U.S. Appl. No. 12/188,375.
U.S. Appl. No. 13/351,764 mailed on Sep. 18, 2013.
U.S. Appl. No. 13/947,150 mailed on Sep. 5, 2013.
*WAP Forum*, "Wireless Application Protocol," Oct. 1999, Wireless Internet Today, pp. 1-20.
Mark Moeglein et al., "An Introduction to SnapTrack Server-Aided GPS Technology,", ION GPS-98, Sep. 15-18, 1998, pp. 333-342, available at http://www.snaptrack.com/atwork.html.
"SignalSoft Wireless Location Services," Copyrighted 1999, earliest capture by Wayback Machine Internet Archive on Aug. 29, 1999, retrieved from internet on Oct. 10, 2013, no publication date provided, available at http://www.signalsoftcorp.com/products/location_manager.html.
U.S. Appl. No. 13/555,239 Office Action mailed Oct. 16, 2013.

\* cited by examiner

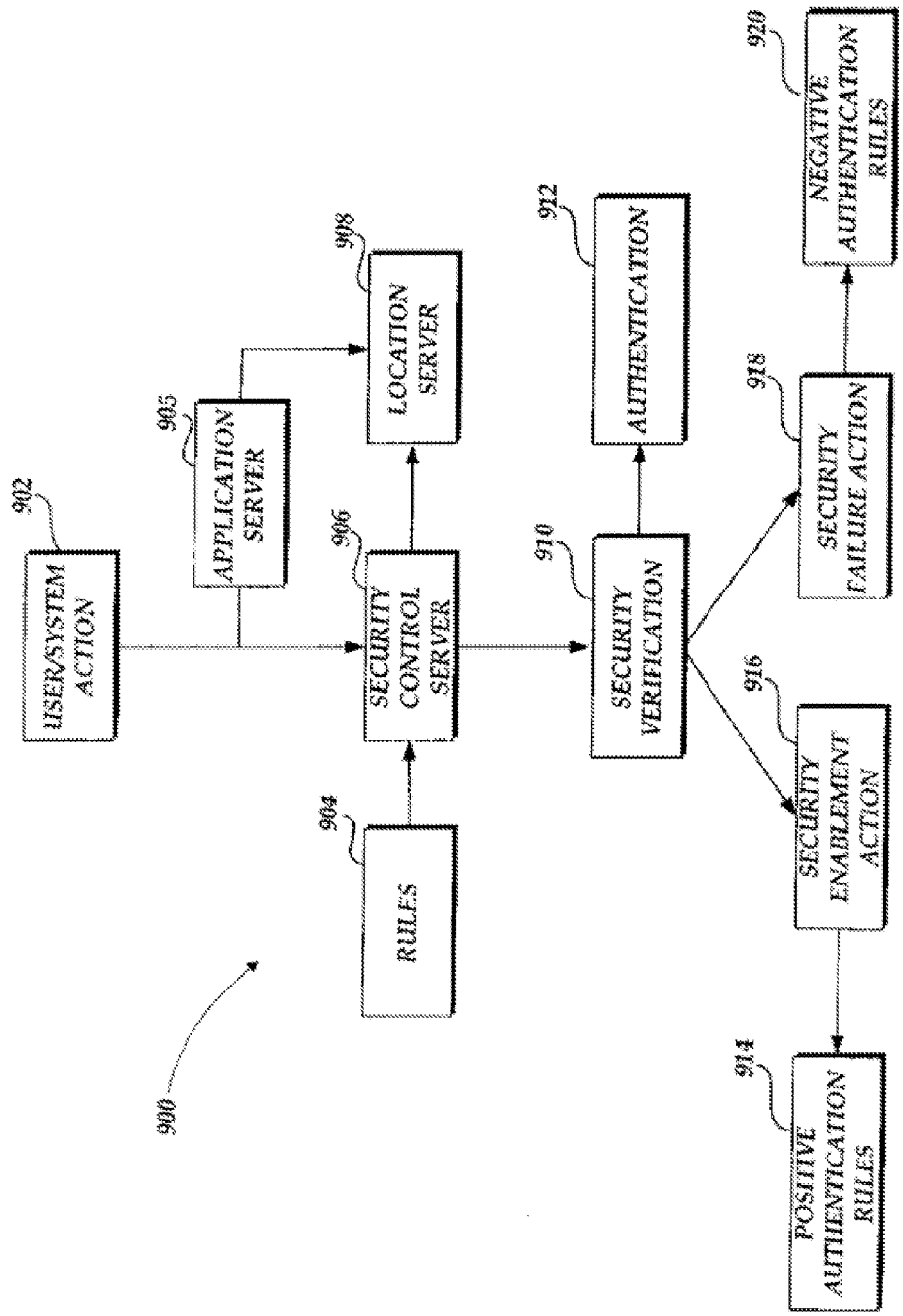

LOCATION-BASED SECURITY RULES

RELATED APPLICATIONS

This application is a Continuation of U.S. application Ser. No. 11/187,347 entitled "Location-Based Security Rules," filed Jul. 21, 2005, which issued on Sep. 23, 2008 as U.S. Pat. No. 7,428,411, which is a Continuation-in-Part of U.S. application Ser. No. 09/739,340, entitled "System and Method for Using Location Information to Execute an Action," filed Dec. 19, 2000, which issued on Oct. 3, 2006 as U.S. Pat. No. 7,116,977 B1, which are incorporated herein by reference.

BACKGROUND OF THE INVENTION

The use of wireless devices is increasing at a rapid rate. A majority of the people living in large metropolitan areas use one or more wireless devices on a daily basis. These people communicate with each other or access information on the Internet using, among other devices, wireless telephones, interactive pagers, personal digital assistants, and handheld computers. As technology continues to improve, wireless devices will become more useful: at the same time, they will decrease in size and weight, making them more portable than ever. Consequently, consumers may carry their wireless devices wherever they go. For some people, their wireless device will become indispensable.

The widespread use of wireless telephones in the United States has prompted the Federal Communications Commission (FCC) to promulgate new rules related to emergency call processing. The FCC's wireless Enhanced 911 (E911) rules require certain Commercial Mobile Radio Services (CMRS) carriers to begin transmission of enhanced location and identity information in two phases. The first phase, started on Apr. 1, 1998, required wireless service providers to transmit a 911 caller's number and section of the cell site from which the call is originated to a public safety answering point (PSAP). The second phase, starting on Oct. 31, 2001, requires all wireless service providers to locate two-thirds of all 911 callers within 125 meters of their physical locations. In other words, for all 911 calls received, a PSAP must be able to pinpoint 67% of the callers within 125 meters.

Under the FCC rules, wireless communication-networks and wireless telephones (or any wireless devices that can be used to call 911), must provide both the identity and location of the caller to a 911 dispatcher. To provide a caller's identity, the wireless device will furnish a device identification, e.g., a mobile identification number (MIN), indicating in most instances the telephone number of the device. To provide a caller's location, the wireless communication networks and wireless devices will use a network-based location system or a handheld location system installed within the wireless devices, or a combination of the two systems. An example of a handheld location system is a Global Positioning System (GPS) receiver. U.S. Pat. No. 5,663,734, which is incorporated herein by reference, discloses a GPS receiver and a method for processing GPS signals.

The E911 mandate has accelerated technological advances in technology. Many new innovations have been achieved to provide solutions to a wide range of problems. Although technological improvements bring unprecedented convenience to the world, they also come with some undesirable side effects, for example, the discourteous use of wireless telephones in public places such as on commuter trains or at movie theaters. In some places, such as in most courtrooms, all wireless device users must have their devices turned off to prevent distracting ringing and beeping noises. Users who forget to turn their wireless devices back on after they leave these places may miss important calls.

The use of wireless communications services is also expensive. For example, payment to wireless service providers for the use of wireless telephones is usually based on the amount of "airtime" consumed. The longer a user is on the telephone, the more expensive the conversation will be. Charges for use of the wireless telephone call could be significantly higher when the user is beyond his or her home market, at a location where the wireless telephone roams in a different market served by a different wireless service provider. Currently, to avoid expensive roaming charges for answering incoming calls, the user must remember to turn off the telephone when he or she leaves the home market. Alternatively, the user must remember not to answer an incoming call when the telephone rings while it is roaming.

The existing wireless communications technology does not allow the wireless device users (the subscribers) to activate one or more service features based on the user's physical location, i.e., without the user's manual activation of the features. For example, a wireless telephone user must manually activate a call forwarding feature subscribed to by him or her if the user wants to have all calls forwarded to his or her voice mailbox each time the user enters a public place such as a movie theater, a concert hall, or a courtroom. Once the user leaves the public place, the user must remember to deactivate the call forwarding feature. To reduce the amount of airtime used, the user must also activate a call forwarding feature to route all incoming calls intended for the wireless telephone to a home wireline telephone when the user is at home where the wireline telephone is located. Similarly, if the user wishes to accept calls intended for the wireless telephone using a wireline telephone at work, the user must manually activate the call forwarding feature to route calls to his or her office when the user is at work.

SUMMARY OF THE INVENTION

According to embodiments of the present invention, location-based security rules are implemented for preventing unauthorized access to a device, application, system, network, etc. Stated differently, the location-based security rules enable a user to access a device, network, system, application, transaction, and/or content, etc., when the user provides proper identification information, wherein the proper identification information is based in part on the location of the user. Embodiments of the present invention are directed to location-based security rules for providing access based at least in part upon a user's access location and request.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIG. 14 is a functional block diagram depicting another embodiment of the present invention.

DETAILED DESCRIPTION

Figure 1:
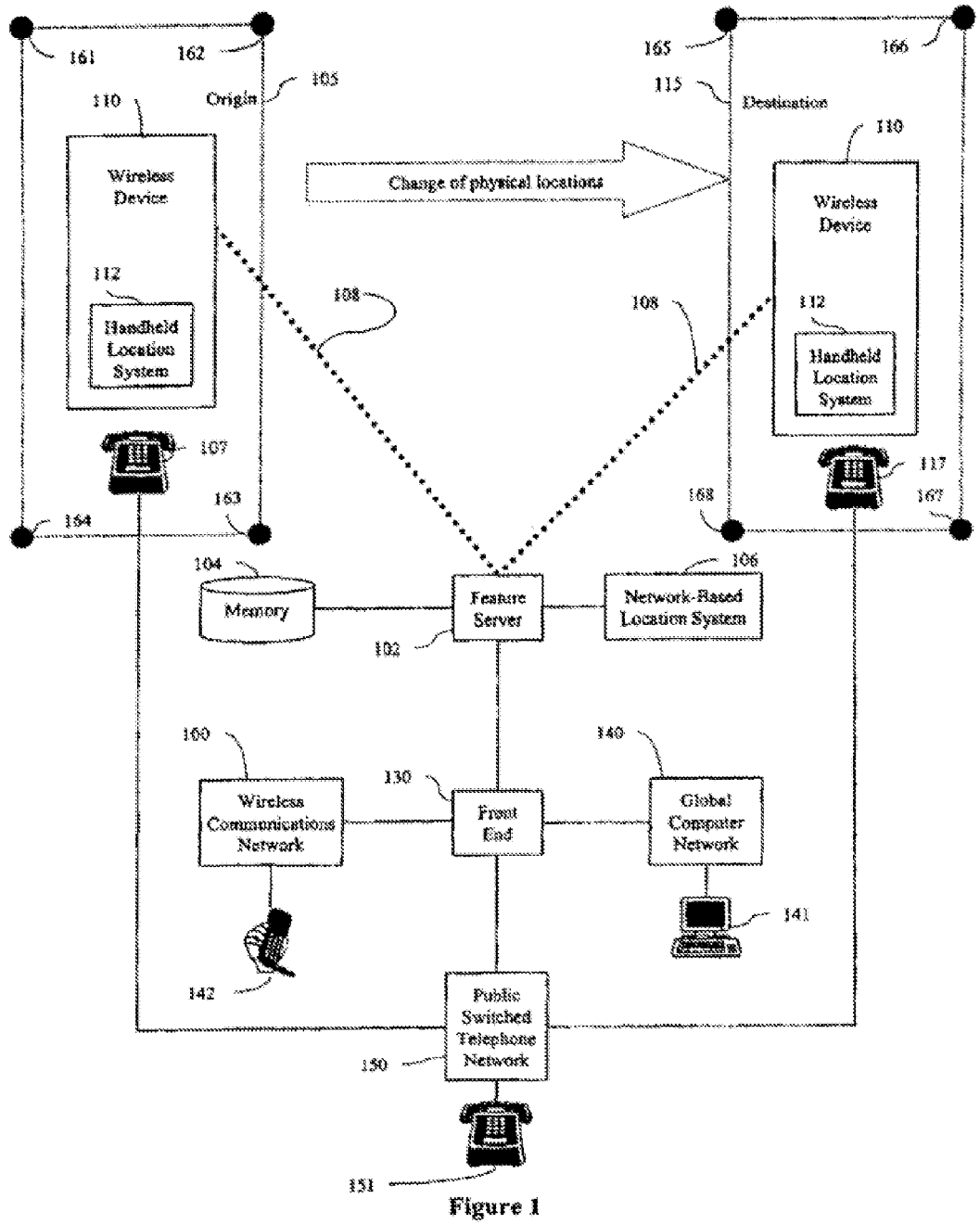
FIG. 1 is a schematic diagram showing the system architecture of an embodiment of the present invention, and illustrating a wireless device in motion, moving from an origin to a destination.

FIG. 1 is a schematic diagram showing the system architecture of an embodiment of the present invention, and illustrating wireless device 110 moving from origin 105 to destination 115. Wireless device 110 may be any wireless apparatus. For example, wireless device 110 may be a wireless telephone, a handheld computer, an interactive pager, or a personal digital assistant, etc. Wireless device 110 may also be incorporated as a component of, among other things, a wrist watch, an attaché case, or an automobile. Preferably, wireless device 110 is a WAP-compatible thin client having a thin browser adapted to communicate with wireless communication network 100 and global computer network 140.

To track where wireless device 110 is located, the system architecture can include one or both of network-based location system 106 and handheld location system 112. Network-based location system 106 may be a component of a wireless communication network 100. Handheld location system 112 can be incorporated as part of wireless device 110. One or both of network-based location system 106 and handheld location system 112 can generate location information pinpointing the location of wireless device 110. In preferred embodiments, both location systems are compatible with the Geographic Information System (GIS) and the Global Positioning System (GPS). Handheld location system 112 is preferably a GPS receiver that is in wireless communication with a constellation of GPS satellites. In preferred embodiments, both location systems can be used to provide redundancy, accuracy, and reliability. The location information comprises point coordinates of wireless device 110. The point coordinates comprise an X component and a Y component of a coordinate system. In an exemplary embodiment of the present invention, the location information comprises a longitude and a latitude. For increased accuracy and granularity, the location information can further comprise an altitude. In preferred embodiments, the location information can pinpoint the location of wireless device 110 to within 125 meters, as required by the E911 mandate. Both location systems are preferably WAP compatible components.

Figure 2:
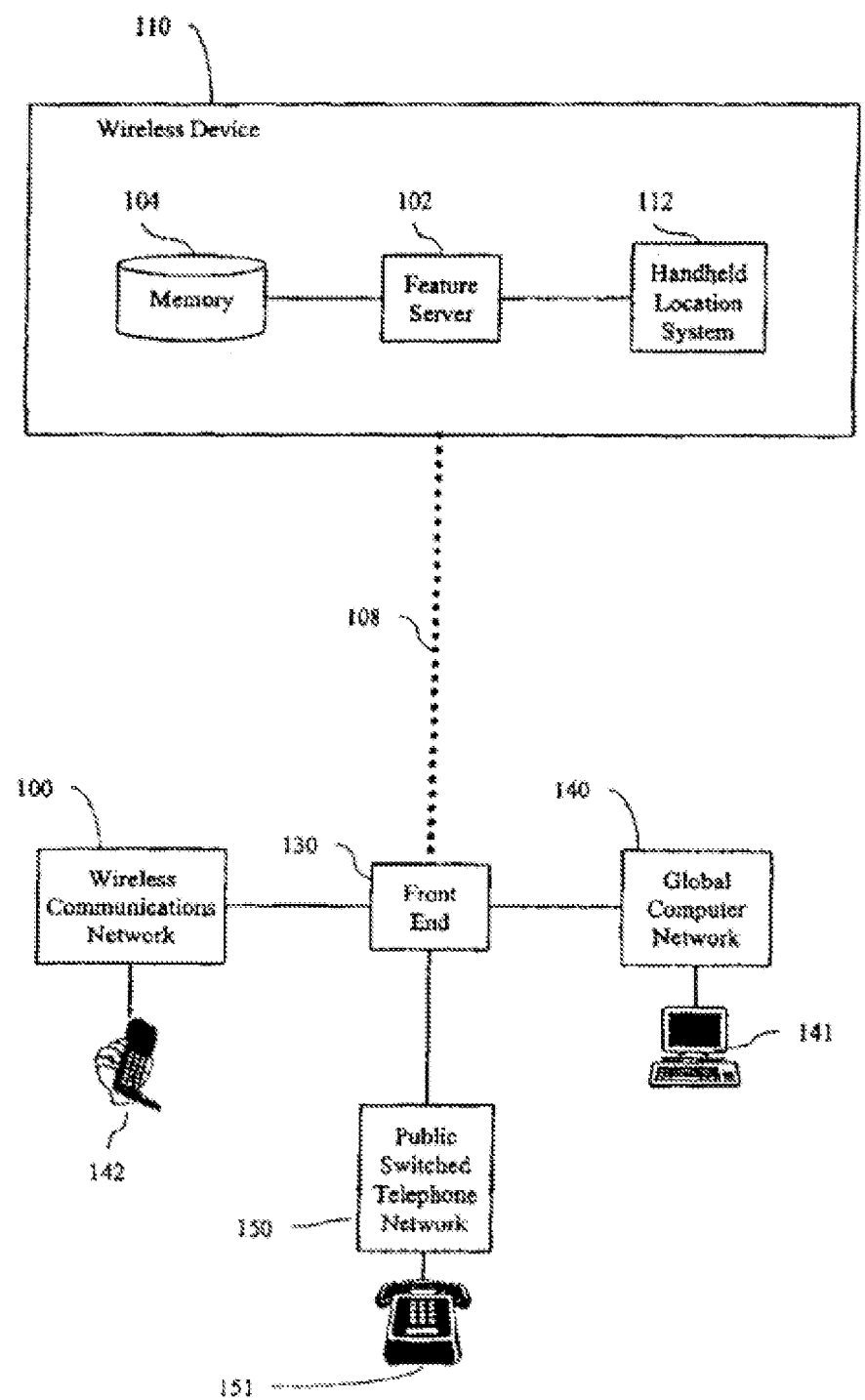
FIG. 2 is a schematic diagram showing an alternative embodiment of the system architecture of the present invention.

In preferred embodiments, feature server 102 is GIS, GPS, and WAP compatible. Feature server 102 can receive the location information from location systems 106 and 112. Feature server 102 can also receive identity information of wireless device 110. The identity information may comprise, for example, a serial number of wireless device 110. The identity information may also be a mobile identification number of a wireless telephone. Like the location systems, feature server 102 may be a component separate from wireless device 110, as shown in FIG. 1. In other embodiments, feature server 102 may be a portable unit that is part of wireless device 110 as shown in FIG. 2. In still other embodiments, only one of feature server 102 and location system 112 is provisioned at wireless device 110.

Using the location information and the identity information of wireless device 110, feature server 102 can be adapted to execute a large number of actions according to subscriber rules, instructions, or preferences provided by a subscriber. For example, in an embodiment involving wireless telephony in which wireless device 110 is a wireless telephone, feature server 102 could use the location information and the identity information to activate one or more service features subscribed to by the subscriber who uses the wireless telephone. Any service features available in wireless communications may be activated or deactivated by the present invention. These service features can include call forwarding, call placing or initiating, and voicemail greeting recording. In an embodiment involving a global computer network, feature server 102 could use the information to, for example, send an e-mail or operate a machine over the global computer network.

The subscriber rules, instructions, or preferences may be specified by the subscriber or created by feature server 102 based on the subscriber's habits for using wireless device 110. The subscriber rules may be provided to feature server 102 via a number of channels. For example, the subscriber rules may be keyed in by the subscriber or other persons using a keypad on wireless device 110. Alternatively, the subscriber rules may be provided via wireless communications network 100, global computer network 140, and PSTN 150.

As discussed above, in preferred embodiments of the present invention, location systems 106 and 112, and feature server 102 are WAP compatible. WAP is an application environment and set of communication protocols for wireless devices designed to enable manufacturer-, vendor-, and technology-independent access to global computer network 140 and advanced wireless telephony services provided by wireless communication network 100. An example of global computer network 140 is the Internet. WAP provides wireless Internet access through digital cellular networks, giving network users a menu driven method for downloading information, such as flight schedules and bank account balances, to wireless devices from the Internet. WAP is described in WAP version 1.1, which is herein incorporated by reference in its entirety.

Although shown as a separate component in FIGS. 1 and 2, memory 104 could be an integrated component of feature server 102. Memory 104 can store, for example, the location information, the identity information, and the subscriber rules. In addition, memory 104 may be populated with, among other things, a database that contains point coordinates of locations or areas likely to be encountered or visited by wireless device 110. In addition, memory 104 may contain a database relating or associating popular places with their location information including longitudes and latitudes. Preferably, information contained in memory 104 is in the GIS or GPS format, or in both formats.

Origin 105 shown in FIG. 1 is an area delineated by nodes 161, 162, 163 and 164. Destination 115 is defined by nodes 165, 166, 167, and 168. Each of nodes 161 through 168 can be characterized by point coordinates. The point coordinates comprise an X component and a Y component of the same coordinate system that defines the location information. Preferably, the point coordinates comprise a longitude and a latitude. Wireline telephones 107 and 117 are located at origin 105 and destination 115, respectively.

In preferred embodiments, the present invention further comprises front end 130, which is an intermediary component that connects feature server 102 to wireless communications network 100, global computer network 140, and public PSTN 150. As indicated in FIGS. 1 and 2, wireless communications network 100, global computer network 140, and PSTN 150 are accessible by various machines, including computer 141, wireless telephone 142, and wireline telephone 151.

Front end 130 comprises a profile management system. Through front end 130, a subscriber of the present invention may supply, modify, or otherwise manipute service features controlled by feature server 102. For example, the subscriber may change the subscriber rules using front end 130. The subscriber may access front end 130 using computer 141, wireless telephone 142, or wireline telephone 151, in addition to wireless device 110 itself.

Interactions among the various components described above have a large number of applications in wireless communications and consumer electronics. For the purposes of demonstration, some specific embodiments or examples of how the present invention may be implemented are discussed below. Although the examples best illustrate the present invention, one of ordinary skill in the art would appreciate that other embodiments are possible in light of the disclosure. In addition, while the system operation described herein and illustrated in the diagrams and flowcharts contains many specific details, these specific details should not be construed as limitations on the scope of the invention, but rather as examples of preferred embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

Figure 3:
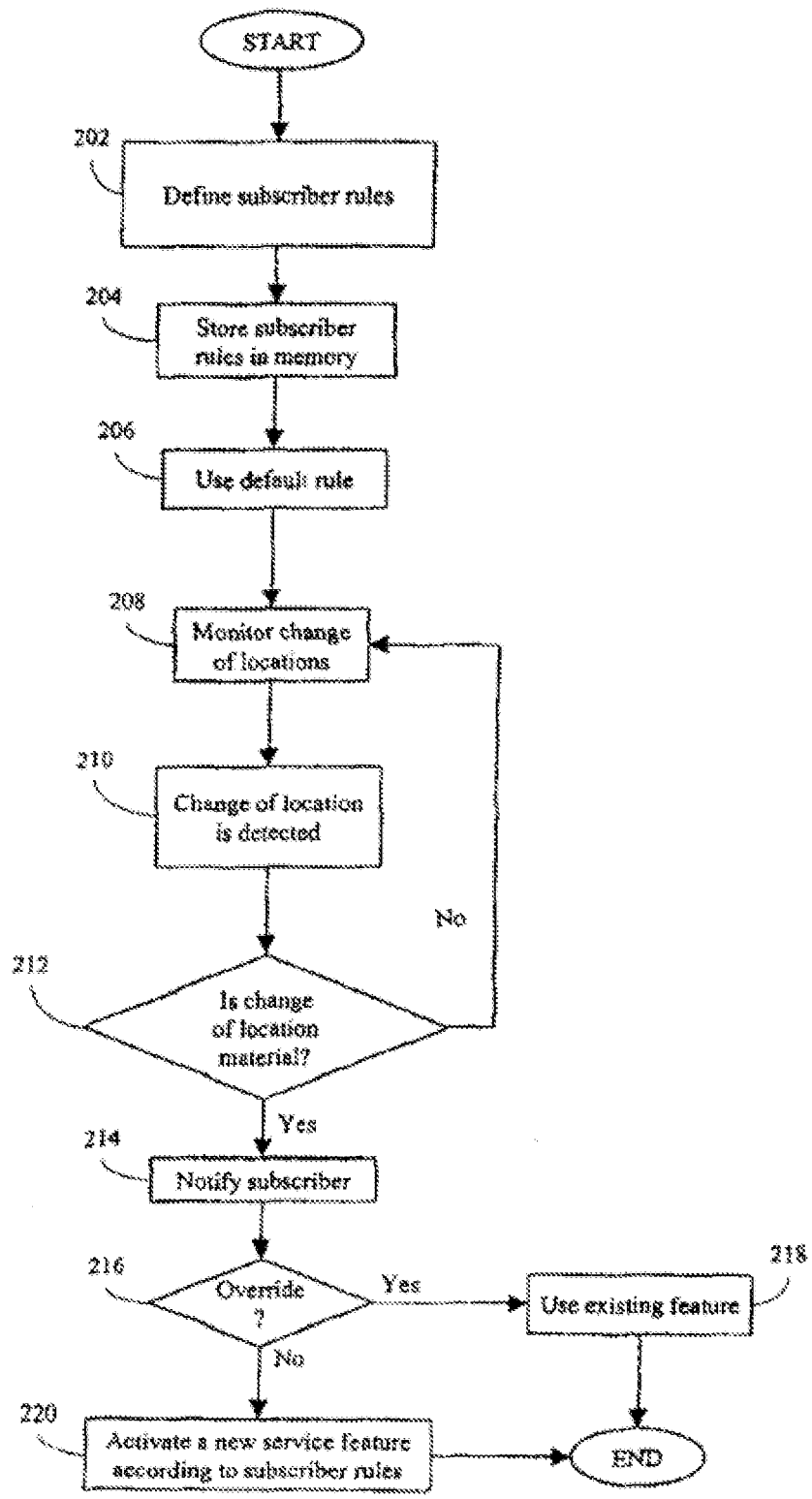
FIG. 3 is a flowchart illustrating general steps involved in using an embodiment of the present invention.

FIG. 3 is a flowchart illustrating general steps involved in using an embodiment of the present invention. For clarity, references are made to components shown in FIGS. 1 and 2. In specific embodiments of the present invention, one or more of these general steps may be used. Furthermore, each of the general steps may include one or more sub-steps. Although these general steps and sub-steps are discussed herein sequentially, the steps may be implemented in any combination and in any logical order to accomplish a specific purpose. Furthermore, specific embodiments of the present invention may include additional steps not discussed herein.

In step 202, a subscriber to the service of the present invention, e.g., the user of wireless device 110, can define a set of subscriber rules, instructions, or preferences. The subscriber rules relate or associate location information with the execution of an action. Referring to FIGS. 1 and 2, assuming wireless device 110 is a wireless telephone, specific examples of the subscriber rules may include:

(1) When the wireless telephone is in origin 105, i.e., within the boundaries delineated by nodes 161, 162, 163 and 164, feature server 102 routes all calls intended for the wireless telephone to wireline telephone 107.

(2) When the wireless telephone is in destination 115, i.e., within the boundaries delineated by nodes 165, 166, 167, and 168, feature server 102 routes all calls intended for the wireless telephone to wireline telephone 117.

(3) When the wireless telephone is in neither origin 105 nor destination 115, use a default rule, e.g., feature server 102 allows the wireless telephone to accept calls.

In step 204, the subscriber rules can be stored in memory 104. The subscriber rules may be stored using a number of channels, including via an input device on wireless device 110, other components of wireless communications network 100, global computer network 140, and PSTN 150 that are shown in FIGS. 1 and 2. The subscriber rules may be stored in memory 104 using any known format. In preferred embodiments, the subscriber rules can be contained in a database that relates a specific location with a specific action to be executed when wireless device 110 is in the specific location.

Feature server 102 can operate under a default rule in step 206, e.g., allowing wireless device 110 to accept all calls, unless wireless device 110 is at origin 105 or destination 115. In step 208, feature server 102 can monitor location information to determine whether wireless device 110 has changed locations. As mentioned above, the location information may be generated by either handheld location system 112 or network-based location system 106, or by a combination of both location systems. The location systems can generate the location information as specified in the subscriber rules. For example, the location information may be generated at regular intervals. Furthermore, the location systems may generate the location information at designated or scheduled times specified by the subscriber rules.

In preferred embodiments, handheld location system 112 is a GPS receiver that can generate the location information using information received from a constellation of GPS satellites. Network-based location system 106 can generate the location system using triangulation across cell sites based on signal strength experienced by wireless device 110. In other embodiments, the location information may be generated using designation of cell sites. For example, if origin 105 and destination 115 are within wireless coverage of two distinct and separate cell sites of a wireless communications network in which wireless device 110 operates, the location information pinpointing the location of wireless device 110 may be determined based on which cell site is exchanging wireless signals with wireless device 110.

For discussion purposes, it is assumed that wireless device 110 is initially located in origin 105, i.e., within the area delineated by nodes 161, 162, 163, and 164. The location system can generate initial location information and provide feature server 102 with the initial location information. Feature server 102 can store the initial location information in memory 104, and route all calls intended for wireless device 110 to wireline telephone 107. Assuming further that wireless device 110 is then moved from origin 105 to destination 115, crossing a first boundary defined by nodes 162 and 163 and a second boundary defined by nodes 165 and 168. One or both location systems 106 and 112 can generate a first subsequent location information after wireless device 110 crosses the first boundary. The first subsequent location information can then be provided to feature server 102. In step 210, feature server 102 can detect a change of location because the first subsequent location information is different from the initial location information.

In step 212, a determination can be made on whether the change of location is material. The materiality depends on whether wireless device 110 has been moved to a different location in which a different action should be executed by feature server 102. In the example, a change is considered not material unless wireless device 110 crosses the first or the second boundaries. Here, since the first subsequent location information indicates that wireless device 110 has crossed the first boundary, the change is considered material.

In step 214, the subscriber can be notified that a material or actionable change of location has been detected, and the subscriber can be given an opportunity to override the subscriber rules. In preferred embodiments, a notification provided to the subscriber may be executed using any known method. For example, a vibration on, or a ringing tone from, wireless device 110 could be used to alert the subscriber that, unless the subscriber otherwise overrides, a new service feature will be activated. The subscriber may then see or hear a message, e.g., "You have left origin 105, unless you press the Cancel key, all incoming calls will be accepted."

If in step 216 the subscriber chooses to override, she can press a key that is responsive to the notification, e.g., the "Cancel" key, on wireless device 110. The process then goes to step 218, in which the existing service feature will continue to operate, i.e., feature server 102 will continue to forward all calls intended for wireless device 110 to wireline telephone 107. Otherwise, the process goes to step 220, and a new service feature is activated according to the subscriber rules, i.e., stop forwarding calls to wireline telephone 107, and begin accepting calls using wireless device 110.

If in step 208 a second subsequent location information is generated before wireless device 110 crosses the second boundary, then in step 210, when feature server 102 compares the second subsequent location information with the first subsequent location information, feature server 102 detects a change of location. In step 212, this new change of location is considered not material because wireless device 110 did not cross either the first or the second boundaries. In this case, the process returns to step 208.

If in step 208 a third subsequent location information is generated after wireless device 110 crossed the second boundary defined by nodes 165 and 168, a comparison of the second and the third subsequent location information by feature server 102 in step 210 then indicates that another change of location has been detected. In step 212, feature server 102 may determine that the change is material. In step 214, a notification, e.g., "You have entered destination 115, unless you press the Cancel key, all incoming calls will be forwarded to wireline telephone 117." The subscriber may then decide in step 216 whether to override the subscriber rules.

Instead of defining the subscriber rules ahead of time in step 202 for feature server 102 to follow, feature server 102 may be programmed to define the subscriber rules based on the subscriber's habits for using wireless device 110. For example, if all location information generated by the location system and all actions executed by the subscriber are stored in memory 104 by feature server 102, after a definite period of time, sufficient data would be collected to establish what the subscriber's habits were for using wireless telephone 110. The subscriber may then decide whether to adopt the habits as the subscriber rules.

There are numerous applications and embodiments for the present invention. Set forth below are four specific examples of how the present invention may be used. Although these examples best illustrate the present invention, one of ordinary skill in the art would appreciate that these specific examples contain many specific details, and these specific details should not be construed as limitations on the scope of the invention. Accordingly, the scope of the invention should be determined not by the embodiments and the examples illustrated, but by the appended claims and their equivalents.

Figure 4:
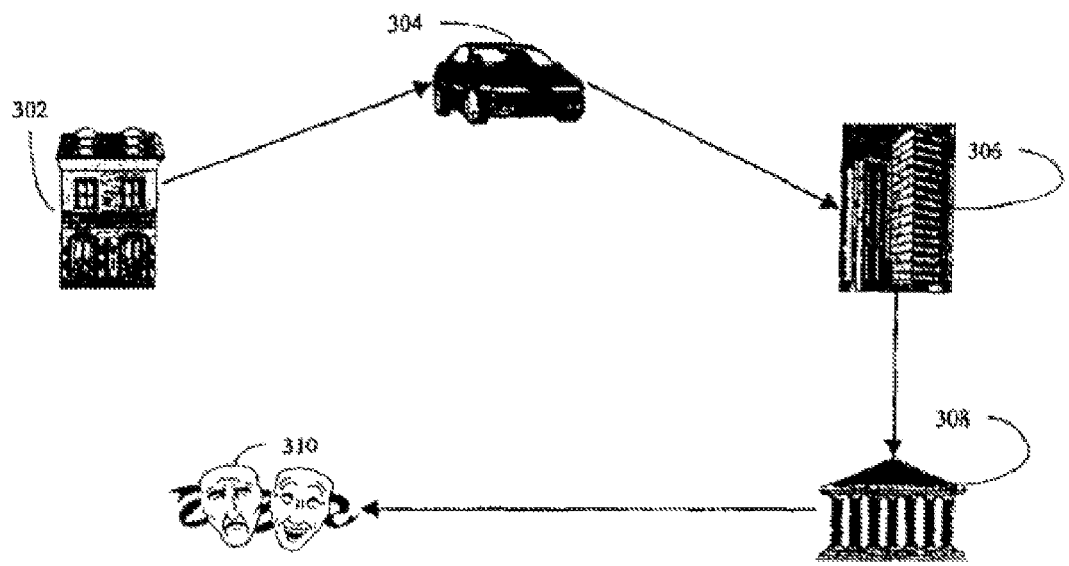
FIG. 4 is a schematic diagram illustrating a specific example of a subscriber using a first specific embodiment of the present invention within a wireless communication network.

FIG. 4 is a schematic diagram illustrating a specific example of the use of a first specific embodiment of the present invention by a subscriber who travels within a wireless communication network operated by a wireless service provider. Home 302, automobile 304, building 306, courthouse 308, and theater 310 are places that the subscriber spends some of his time most days, and each of these places are located within wireless coverage of the wireless service provider.

In this example, the subscriber has wireless device 110. The subscriber has a subscription to the service of the present invention. The subscriber also has a home wireline telephone and an office wireline telephone located at home 302 and the seventh floor of building 306, respectively. Although the subscriber does not want to miss any incoming calls to his wireless device 110, he does not want to receive all calls on his wireless device 110 all the time either. The subscriber wishes to use his wireless device 110 to receive calls only when his is not in one of four places: home 302, the seventh floor of building 306, courthouse 308, and theater 310. When at home 302, he wants all calls to be forwarded to his home wireline telephone. When on the seventh floor of building 306, he wants all calls to be forwarded to the office wireline telephone. When in courthouse 308, he wants to have his wireless device 110 temporarily disabled, and all calls are forwarded to his voice mailbox. When in theater 310, the subscriber wants to have an option to decide whether to receive an incoming call. In all other places, he is available to use his wireless device 110 to answer calls, receive voice mail messages, and using his wireless device 110 to access information on a global computer network.

Referring to both FIGS. 1 and 4, the subscriber's wireless device 110 may be a wireless telephone without handheld location system 112. Wireless device 110, network-based location system 106, feature server 102, and memory 104 are all part of the wireless communication network operated by the wireless service provider of which the subscriber is a customer. In a different example, the system architecture shown in FIG. 2 may be used.

Figure 5:
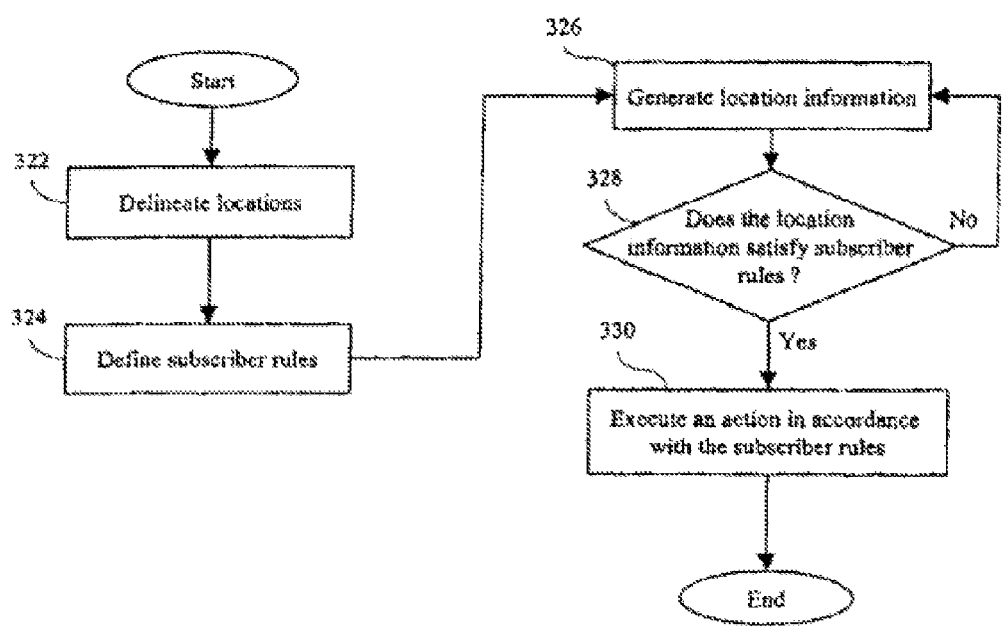
FIG. 5 is a flowchart illustrating the steps involved in using the first specific embodiment shown in FIG. 4.

FIG. 5 is a flowchart illustrating the steps involved in using the first specific embodiment shown in FIG. 4. In step 322, each of home 302, the seventh floor of office 306, courthouse 308, and theater 310 is delineated. Delineation may be performed using a number of methods. One delineation method comprises the use of at least three corner nodes. Another delineation method may comprise the use of one center node and a radius. Each node can comprise point coordinates. Preferably, the point coordinates comprise an X component and a Y component of a coordinate system. For increased capability, the point coordinates can further comprise a Z component of the coordinate system. One coordinate system that is suitable for the present invention has longitude, latitude, and altitude as its X, Y, and 2 components, respectively.

For example, home 302 could be delineated as a circular area with a 125-meter radius with a center node. Wireless device 110 can be considered to be within home 302 as long as location information generated by location system 106 indicates that wireless device 110 is within the 125-meter circle, regardless of the altitude. The seventh floor of building 306 could be defined as a block having eight nodes, each of which has X, Y, and Z components. Courthouse 308 and theater 310 may be similarly defined using the same or other geometrical shapes including an ellipse or a polygon with at least three nodes for two dimensional delineations.

In step 324, specific call routing instructions can be defined and stored in memory 104 shown in FIG. 1 or 2. Storage of the call routing instructions in memory 104 may be performed via different channels including wireless communications network 100, global computer network 140, and PSTN 150. Table 1 below contains call routing instructions for the subscriber.

TABLE 1

| Call Routing Instructions | |
| --- | --- |
| Location of Wireless Device 110 | Instructions |
| Home 302 | Forward calls to home wireline telephone |
| Seventh Floor of Building 306 | Forward calls to office wireline telephone |
| Courthouse 308 | Forward calls to voice mailbox |
| Theater 310 | Turn off ringer, turn on vibrator, and provide call management options |
| All other places | Enable ringer and accept all incoming calls (the default rule) |

The call routing instructions in Table 1 may be paraphrased as follows:

(1) When wireless device 110 is within 125 meters of the center node of home 302, all incoming calls are forwarded to the subscriber's home wireline telephone.

(2) When wireless device 110 is on the seventh floor of building 306, all incoming calls are forwarded to the subscriber's office wireline telephone.

(3) When wireless device 110 is in courthouse 308, all incoming calls are forwarded to the subscriber's voice mailbox.

(4) When wireless device 110 is in theater 310, the ringer feature of wireless device 110 is disabled and the vibration feature is enabled. In addition, a menu of call management options is presented to the subscriber on the display of wireless device 110.

(5) When wireless device 110 is not in any of the above four places, all incoming calls are alerted to the subscriber using the ringer feature (the default rule).

For convenience, both location delineations and call routing instructions can be collectively referred to herein as subscriber rules. The subscriber rules could be initially set up, or subsequently modified, by the subscriber via a representative of the wireless service provider, or through a "self-help" feature using, among other things, wireless device 110 itself, wireline telephone 151 through PSTN 150, computer 141 through global computer network 140, or wireless telephone 142 through wireless communications network 100. Wireless communications network 100 may be the same or a different network of which wireless device 110 is apart.

In step 326, a location system, such as network-based location system 106 shown in FIG. 1, can generate location information pinpointing the location of wireless device 110, and the location information is provided to a feature server, such as feature server 102 shown in FIG. 1. As discussed above, the location information most preferably comprises point coordinates having the X and Y, and possibly, Z, components of the coordinate system. The location information may be generated using a number of different methods. One method is by triangulation of signal strengths experienced by wireless device 110 when in communication with a plurality of antennas. The location information may be generated at regular intervals, e.g., every five minutes. In preferred embodiments, the location information can be generated according to a schedule prepared by the subscriber as part of the subscriber rules. For example, the subscriber may specify that the location information be generated every five minutes between 8 a.m. and 8 p.m. on Monday to Friday; and at all other times, every hour on the hour.

In step 328, feature server 102 can be adapted to review the location information and determines whether the location information fits within the parameters of the subscriber rules. If the determination is in the affirmative, the process goes to step 330. Otherwise, the process returns to step 326.

Referring to FIG. 4 and assuming the subscriber brings wireless device 110 to various locations in the following order: home 302, building 306, courthouse 308, and theater 310. When in transit from home 302 to building 306, the subscriber uses automobile 304. In step 328, when the location information indicates that wireless device 110 is at home 302, an incoming call intended for wireless device 110 is forwarded to the home wireline telephone in step 330. As soon as the subscriber leaves home 302, i.e., he is more than 125 meters away from the center node of home 302, feature server 102, in step 330, stops forwarding all calls intended for wireless device 110 to the home wireline telephone. Also in step 330, feature server 102 can operate under the default rule, i.e., it can allow wireless device 110 to accept all calls. Therefore, while the subscriber is in automobile 304 from home 302 to building 306, he receives calls intended for wireless device 110 using wireless device 110 itself.

Wireless device 110 can continue to receive calls even as the subscriber enters the parameter of building 306, i.e., the X and Y components of the location information are within the delineated boundaries of building 306. The call forwarding feature to his office wireline telephone is not activated until he reaches the seventh floor, i.e., when the Z component of the location information matches the value specified in the subscriber rules. If the subscriber goes to a different floor of building 306, e.g., the sixth floor or the tenth floor, wireless device 110 can return to use the default rule, i.e., it can receive all calls.

When the location information indicates that the subscriber has entered courthouse 308, feature server 102 immediately activates the voicemail feature of the subscriber rules. Once the feature is activated, all incoming calls are automatically forwarded to the subscriber's voice mailbox. In other words, wireless device 110 does not ring as long as it remains within the delineated boundaries of courthouse 308. If a voicemail was left in the voice mailbox while the subscriber was in courthouse 308, then as soon as he leaves courthouse 308, he is alerted to the voicemail message by feature server 102 through a ringing tone (or a vibration signal) from wireless device 110.

When the subscriber enters the delineated boundaries of theater 308, another service feature is activated. This time, the subscriber is alerted to an incoming call by the vibrator feature of wireless device 110 instead of the ringer feature. Through a display on wireless device 110, the subscriber is given a list of call management options outlining what he could do with the incoming call. For example, the subscriber is asked to select one option from the choices of "Answer," "Hold," "Reject," "Voice Mail," and "Forward to Office." If the subscriber decides to accept the call but at a few seconds later, he can simple choose "Hold," and the caller will hear a recorded voice of the subscriber, e.g., "I'm in the theater, please wait for a few more seconds as I find my way to a place where I can talk." The subscriber then excuses himself, finds a convenient place to talk, and presses another key on wireless device 110 so that he could start talking with the caller. Alternatively, if the subscriber does not want to take the call, he could choose one of the remaining options. As soon as the subscriber leaves theater 310, the default rule is in operation again unless the subscriber in a location that is defined by the subscriber rules.

Figure 6:
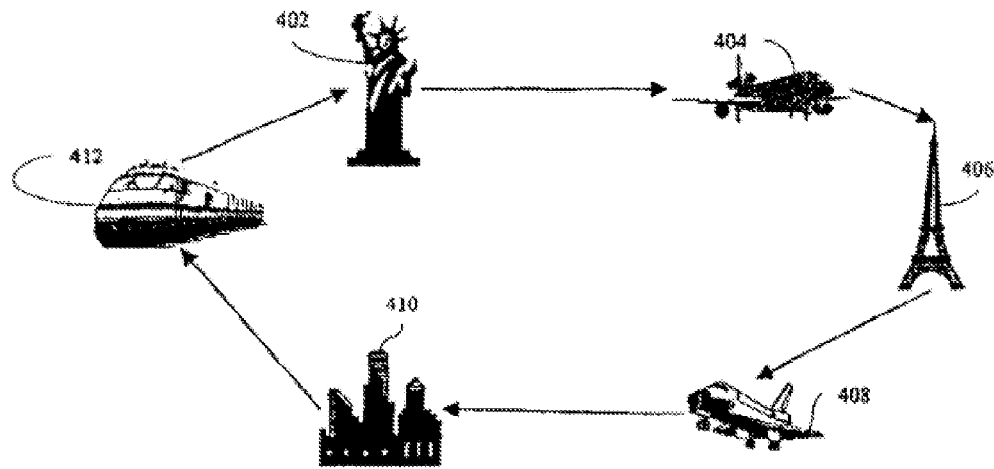
FIG. 6 is a schematic diagram illustrating a specific example of a subscriber using a second specific embodiment of the present invention in areas served by more than one wireless communication network.

FIG. 6 is a schematic diagram illustrating a specific example of using a second specific embodiment of the present invention by a subscriber whose traveling covers areas served by more than one wireless communication network. In this example, the subscriber lives and works in home city 402 where she is a customer of a wireless service provider. She travels occasionally to foreign city 406 for vacation. She visits domestic city 410 regularly to conduct business. The wireless service provider has roaming agreements with other wireless service providers in domestic city 410 and foreign city 406. As a result, the subscriber may use her wireless device 110 in home city 402, domestic city 410, and foreign city 406. Airplanes 404 and 408 and train 412 are vehicles that transport the subscriber from a city to another city. In this embodiment, the subscriber rules are established based on the subscriber's habits for using wireless device 110. In this example, wireless device 110 may be a wireless telephone. The location system can be a handheld unit such as handheld location system 112 shown in FIG. 2. Furthermore, feature server 102 and memory 104 can be part of wireless device 110 as shown in FIG. 2. Again, the system architecture shown in FIG. 1 may also be used.

Figure 7:
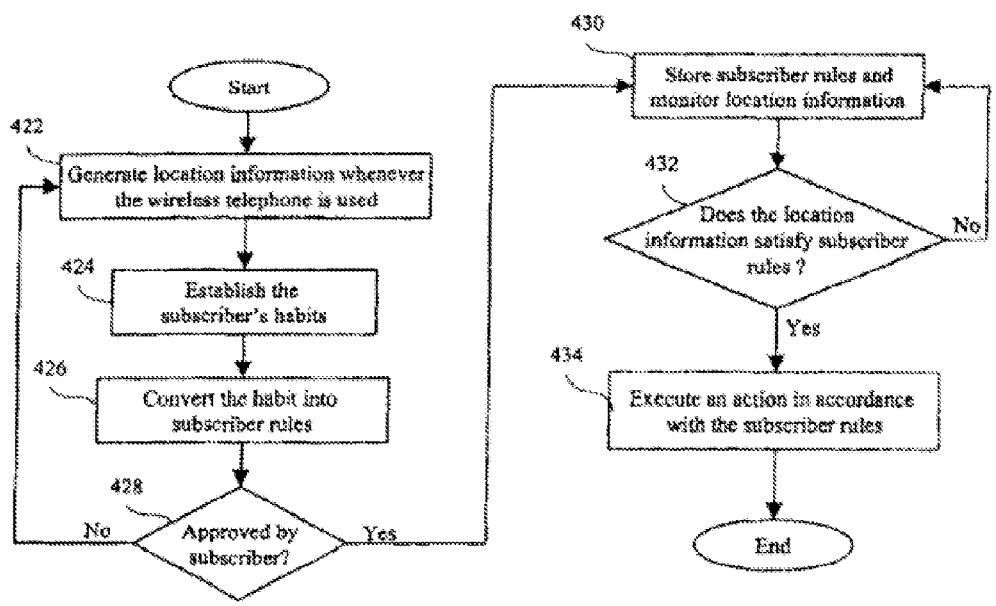
FIG. 7 is a flowchart illustrating the steps involved in using the second specific embodiment shown in FIG. 6.

FIG. 7 is a flowchart illustrating the steps involved in using the second specific embodiment shown in FIG. 6. In step 422, the location system can generate location information pinpointing the location of wireless device 110 whenever wireless device 110 is used. The location information and the habits of the subscriber for using wireless device 110 can be stored, for example, in memory 104 that is in communication with feature server 102. For example, feature server 102 can record in memory 104 frequently dialed telephone numbers and relates those frequently dialed numbers with the location information and the time at which the calls were made.

In step 424, after feature server 102 has built up substantial experience with the subscriber's movements and habits, e.g., two months, the subscriber's habits for using wireless device 110 can be reduced to a finite number of repeated circumstances. In step 426, feature server 102 can convert the habits into subscriber rules. In a specific example, the subscriber rules may contain the following call routing instructions and user preferences:

(1) When wireless device 110 is in home city 402, accept all incoming calls.

(2) When wireless device 110 is in foreign city 406 where wireless device 110 was never used in the last two months, an incoming call is forwarded to his voice mailbox and an announcement: "I'm out of town, please leave a message," is played as a greeting.

(3) When wireless device 110 is in domestic city 410 where he uses wireless device 110 to accept calls from a selected list of callers, only incoming calls from those callers are acceptable. All other incoming calls are forwarded to his voice mailbox.

(4) When wireless device 110 is in an airport, notify the subscriber that he is in the airport, and wireless device 110 will be turned off in thirty minutes unless he overrides it or specify a time at which to turn off wireless device 110.

(5) When wireless device 110 is approaching home city 402 on train 412 and train 412 is about 20 minutes away from a train station in home city 402, call a driver to pick up the subscriber.

In step 428, the subscriber rules can be presented to the subscriber for her approval. The subscriber rules may be displayed on the mini-browser on wireless device 110 or they may be played as voice recording. If the subscriber does not approve the subscriber rules, the process return to step 422. If the subscriber rules are modified or otherwise approved by the subscriber, the process goes to step 430.

Referring to FIG. 6 and assuming the subscriber is going through the following journey: arriving at a first airport in home city 402; flying on airplane 404; arriving at a second airport; staying in foreign city 406, leaving the second airport; flying on airplane 408; arriving at a third airport; staying in domestic city 410; riding on train 412; and arriving at a train station in home city 402. Steps 430 through 434 of FIG. 7 may be described as follows.

In step 430, location system 112 can generate the location information at regular intervals, e.g., every five minutes. When the subscriber and wireless device 110 arrives at the first airport in home city 402 and generate the location information there, feature server 102 can recognize the location information as a triggering event, i.e., wireless device 110 is in an airport that is identified in the subscriber rules. In step 432, feature server 102 can review the subscriber rules, and determine that the appropriate action is to alert the subscriber that she is in the airport. In step 434, feature server 102 can ring wireless device 110, and display the message: 'You are now at the airport. This telephone will be powered off in thirty minutes unless you enter a number greater than 30." Suppose the departure time is 60 minutes away from the time the message is displayed, and the subscriber wants to wait for an incoming call, the subscriber may use the keypad to enter "60," delaying the auto power off feature from 30 minutes to 60 minutes. When the 60 minutes duration expires, feature server 102 can power off wireless device 110. This feature prevents the subscriber from forgetting to power off her wireless device 110 when she enters airplane 404.

Steps 430 through 434 are then repeated as the subscriber continues her journey. When the subscriber powers on wireless device 110 in foreign city 406, location system 112 can generate new location information in step 430. When feature server 102 receives the new location information, it knows, based on the subscriber rules, that wireless device 110 is in a city where the subscriber does not accept incoming calls. Therefore, although the subscriber may use wireless device 110 to make outgoing calls, all incoming calls will be forwarded to her voice mailbox, thereby saving her roaming fees for answering the incoming calls. If a call is made by a caller to wireless device 110, feature server 102, in step 434, can play the announcement to the caller "I'm out of town, please leave a message."

As the subscriber continues her journey from foreign city 406 to domestic city 410 using airplane 408, similar steps are repeated. For example, the subscriber is reminded about the auto power off feature when she is in the second and third airports.

When the subscriber arrives in domestic city 410 that she visits frequently, feature server 102, in step 432, can review location information generated by location system 112 in step 430, and accepts incoming calls from designated callers in accordance with the subscriber rules in step 434.

When the subscriber is on train 412, location system 112 can continue to generate location information, and feature server 102 can continue to review the location information.

As soon as the train is estimated to arrive at the train station in home city 402, feature server 102 can make a call to a taxi service. This feature is done even if the subscriber is sleeping. The taxi service would hear a voice recording, "This is Ms. Smith. I'm 20 minutes away from the train station. Please come to pick me up."

Figure 8:
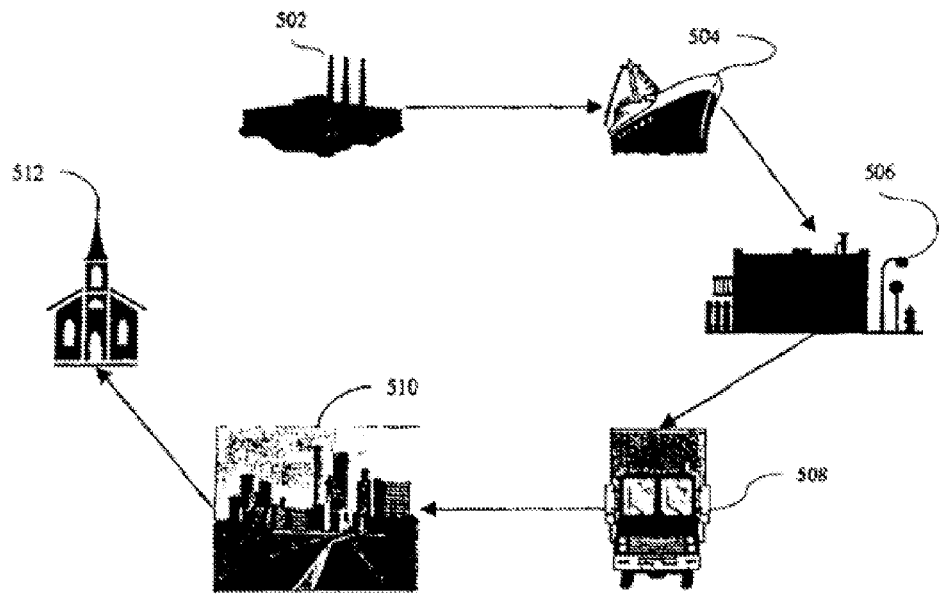
FIG. 8 is a schematic diagram illustrating a specific example of using a third specific embodiment of the present invention to track the delivery of a package.

FIG. 8 is a schematic diagram illustrating a specific example of using a third specific embodiment of the present invention to track the delivery of a piano from factory 502 to church 512 in city 510. Along the delivery route, the piano will be shipped using vessel 504, stored in warehouse 506, and delivered by truck 508. In this embodiment, a handheld location system, such as location systems 112 shown in FIG. 2 can be provisioned on wireless device 110. Wireless device 110 in this embodiment may be an electronic transmitter. The preferred location system 112 in this embodiment is a GPS receiver. Wireless device 110 can be easily attached to the piano. Location system 112 is in communication with a feature server, such as feature server 102 shown in either FIG. 1 or FIG. 2. Feature server 102 may be part of wireless device 110 or it may be residing at a local area network of the subscriber. In this example, the subscriber is the delivery company. As part of its delivery services, the subscriber provides its customer with a service of the present invention through which the piano manufacturer and the piano purchaser may specify before the delivery begin how they would like to be informed of the delivery status.

Figure 9:
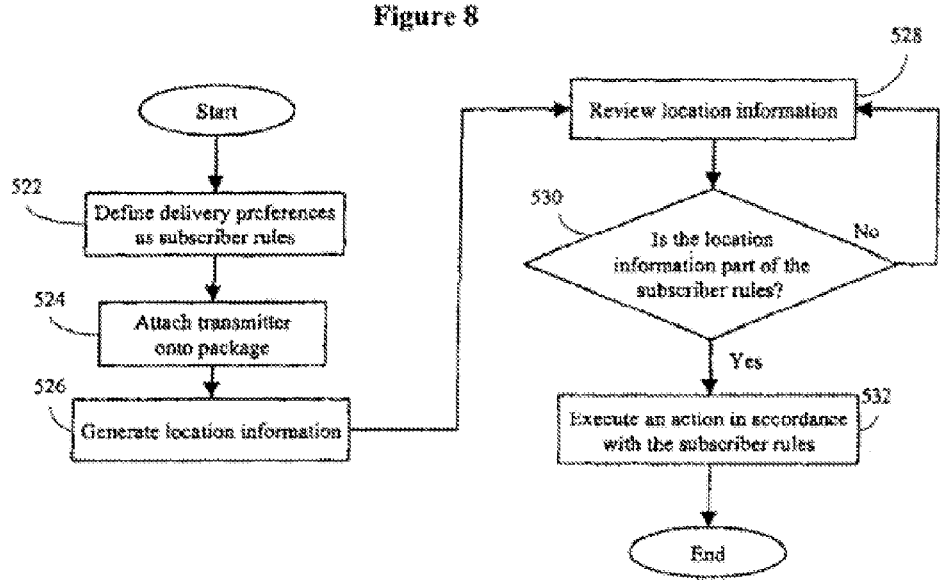
FIG. 9 is a flowchart illustrating the steps involved in using the third specific embodiment shown in FIG. 8.

FIG. 9 is a flowchart illustrating the steps involved in using the third specific embodiment shown in FIG. 8. In step 522, delivery notification preferences (the subscriber rules) can be defined. The subscriber rules may contain inputs from the delivery company, the piano manufacturer, and the piano purchaser. The subscriber rules can be stored in a memory, such as memory 104 shown in FIGS. 1 and 2. Specific examples of the subscriber rules, may include the following:

(1) When wireless device 110 is attached to the piano that is ready for delivery in factory 502, notify the piano purchaser that the piano has been packaged and is ready for delivery.

(2) While vessel 504 is carrying the piano, monitor the speed of the vessel, and periodically inform the subscriber of its status with an estimated time of arrival.

(3) When the piano is stored in warehouse 506, dispatch truck 508 to pick up the piano.

(4) While truck 508 is carrying the piano, periodically calculate the estimated time of arrival by monitoring the speed at which the truck is moving and the distance traveled.

(5) When truck 508 enters the city limits of city 510 where church 512 is located, notify the piano purchaser about the pending arrival.

(6) When the piano is delivered to the piano purchaser and wireless device 110 is detached, print a log documenting the delivery for the piano manufacture and the delivery company.

Once these delivery preferences or subscriber rules are defined, they can be programmed into feature server 102 and memory 104. In step 524, wireless device 110 can be attached to the piano and activated.

Once activated, location system 112 can generate location information in step 526. The location information may be generated continuously or at regular intervals, and the location information can be provided to feature server 102. In other embodiments, the location information may be generated at specific times as programmed in the subscriber rules. In step 528, feature server 102 can review the location information. If in step 530 feature server 102 receives location information that is defined in the subscriber rule, e.g., the piano is now somewhere in the Pacific Ocean on vessel 504, feature server 102 can execute an action in step 532. In these instances, the appropriate action is to review the location information and the speed at which the vessel is traveling, and estimated an arrival time. The appropriate action may further include sending a message to the headquarters of the subscriber informing the subscriber of the status of the status of the delivery. Steps 528 through 532 are repeated as the piano makes its way to the piano purchaser.

For example, when the piano is stored in warehouse 506, feature server 102 can execute another action. This time it may notify the subscriber that the piano has arrived in warehouse 506, and the subscriber can dispatch a truck to pick up the piano. When the piano is being carried by truck 508, location system 112 can continue to generate location information and feature server 102 can continue to monitor the location of the piano and estimate the time of arrival. As soon as truck 508 enters the city limits of city 510, feature server 102 can send a message to the piano purchaser. The message may be a voice recording stating: "The piano you ordered has entered the city limits. It should be arriving at the church momentarily." Once the piano purchaser accepts the piano, wireless device 110 can be removed. A log of the delivery can then printed at the headquarters. The log may then be given to the piano manufacturer for its files.

Figure 10:
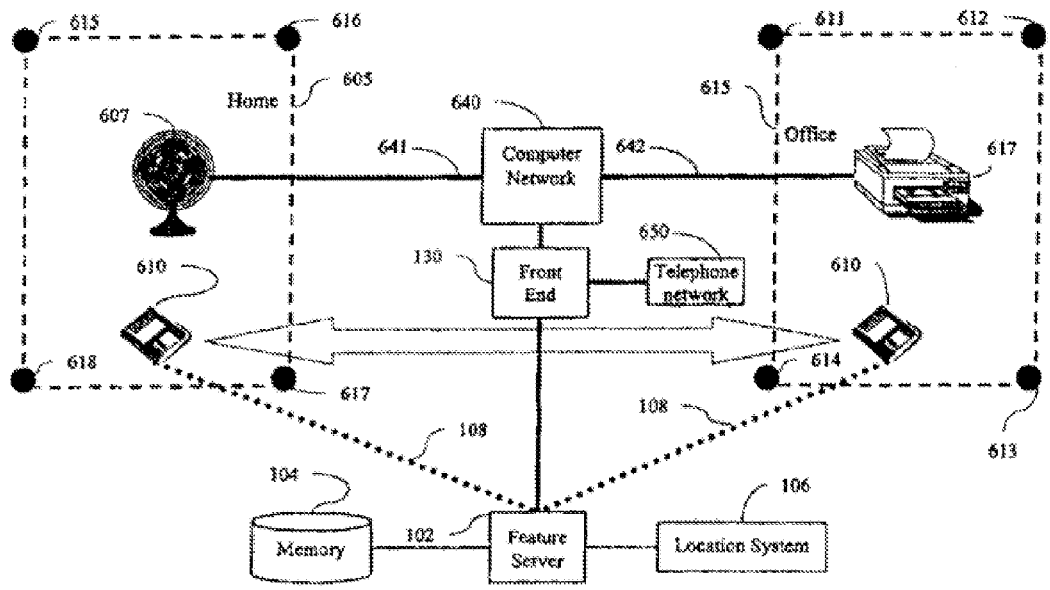
FIG. 10 is a schematic diagram illustrating a specific example of using a fourth specific embodiment of the present invention to remotely operate various office equipment and home appliances controlled by one or more computer networks.

FIG. 10 is a schematic diagram illustrating a specific example of using a fourth specific embodiment of the present invention by a fourth subscriber to activate a machine such as an office equipment and a home appliance controlled by one or more computer networks. In this embodiment, wireless device 110 of the present invention may be handheld computer 610. Appliance 607 and equipment 617 are located in home 605 and office 615, respectively. Feature server 102 is in communication with handheld computer 610 and front end 130. Although shown as separate components, feature server 102, memory 104, and location system 106 may be integrated into handheld computer 610. Front end 130 is in communication with one or more computer networks 640 and at least one telephone network 650. Home 605 is delineated by nodes 615, 616, 617, and 618. Office 615 is delineated by nodes 611, 612, 613, and 614. Communication link 641 connects appliance 607 to computer network 640, and communication link 642 connects equipment 617 to computer network 640. Computer network 640 may be a local area network. Computer network 640 may also be the global computer network known as the Internet. Feature server 102, memory 104, and location systems 106 and 112 communicate with handheld computer 610 via communication link 108. Each of feature server 102, memory 104, and location system 106 is preferably provisioned at handheld computer 610.

Figure 11:
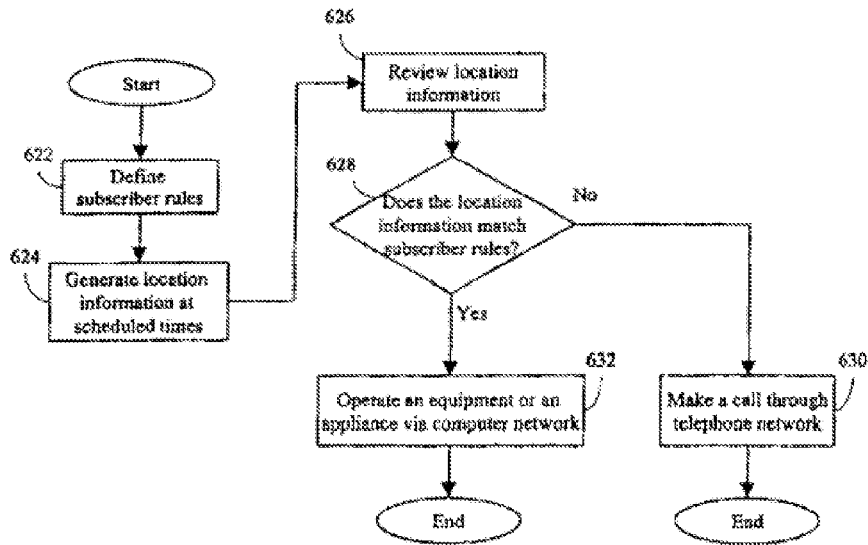
FIG. 11 is a flowchart illustrating the steps involved in using the fourth specific embodiment shown in FIG. 10.

FIG. 11 is a flowchart illustrating the steps involved in using the fourth specific embodiment shown in FIG. 10. In this embodiment, the subscriber can define subscriber rules through an input device on handheld computer 610 in step 622. The subscriber rules may include a provision that activates the location system in step 624 to generate location information pinpointing the location of handheld computer 610 at specific times. For example, feature server 102 can be programmed with subscriber rules such that location system 106 can generate location information at 8:55 a.m. and 5:55 p.m. on Mondays through Fridays. Location system 106 can be otherwise inactive. The subscriber rules in this specific example may include the following:

(1) Generate location information at 8:55 a.m. on Mondays through Fridays. If handheld computer 610 is more than ten minutes away from office 615, call someone in office 615 to inform him that the subscriber is more than ten minutes away from office 615. Otherwise, turn on equipment 617 via computer network 640.

(2) Generate location information at 5:55 p.m. on Mondays through Fridays. If handheld computer 610 is more than 30 minutes from home 605, call someone at home 605. Otherwise, turn on appliance 607 via computer network 640.

At 8:55 a.m. on a Monday, location system 106 can generate the first location information in step 624. In step 626, feature server 102 can review the location information. If in step 628 it is determined that handheld computer 610 is still more than ten minutes away from office 615, feature server 102, in step 630, can make a call to a wireline telephone in office 615 through telephone network 650 to let someone know that the subscriber is more than ten minutes away from office 615. Otherwise, if in step 628 it was determined that the subscriber is fewer than ten minutes away from office 615, then feature server 102 in step 632 sends a message to computer network 640 to turn on equipment 617.

Similarly, at 5:55 p.m., location system 106 can generate a second location information in step 624. In step 626, feature server 102 can review the location information. If in step 628 it is determined that the subscriber is not within 30 minutes from home 605, feature server 102 can make a call, in step 630, through telephone network 650 to a wireline telephone at home 605 that the subscriber is more than 30 minutes away from home 605. Otherwise, feature server 102 can activate appliance 607 in step 632 via computer network 640.

Embodiments of the present invention are directed to location-based security rules for providing access to a device, network, system, application, transaction, and/or content based upon a user's access location and request. The location-based security rules provide access if a user provides one or more proper identifiers which can be dependant upon the user's location and security rules.

Figure 12:
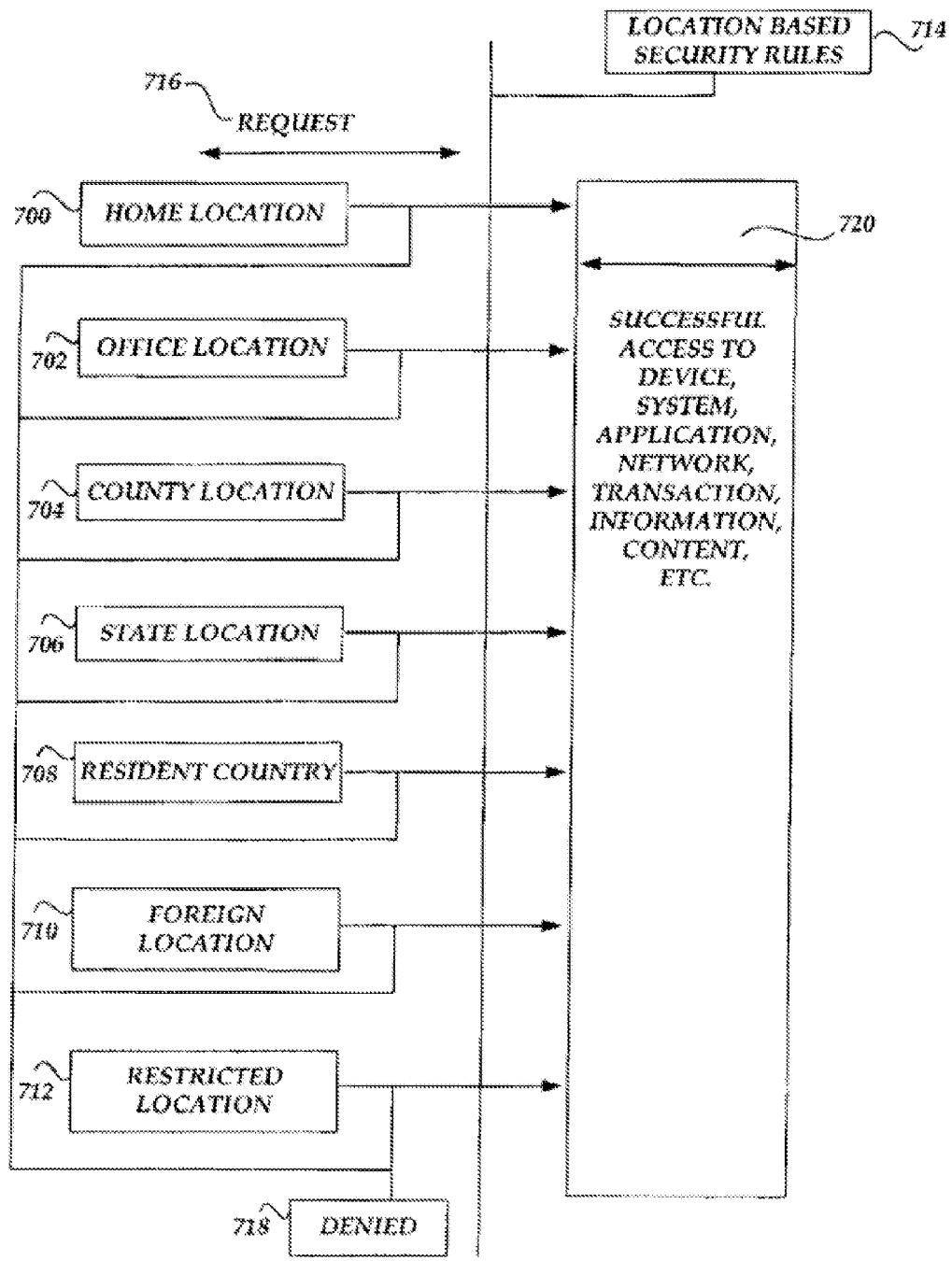
FIG. 12 is a functional block diagram depicting an embodiment of the present invention.

As described above, methods and systems are used to provide location information, wherein the location information is used in various ways. Referring now to FIG. 12, yet another embodiment of the invention is described. A number of physical locations are depicted in FIG. 12, including a home location 700, office location 702, county location 704, resident state location 706, resident country location 708, foreign location 710, and a restricted location 712. As described below, a user may be physically located at one of the locations shown in FIG. 12, and others, at various times. Moreover, a level of security may be administered based upon the user's physical location and/or access request.

As used herein, the home location 700 generally refers to a user's residence. The office location 702 generally refers to a user's principal place of business. The resident county location 704 generally refers to the user's home county. The resident state location 706 generally refers to the user's home state. The resident country location 708 generally refers to the user's country of citizenship. The foreign location 710 refers to a location outside of the user's resident country location 708. The restricted location 712 refers to a location where a user typically has a limited amount of access to information. According to alternative embodiments of the invention, the restricted location 712 may be enabled for any of the above-described locations and others. As described herein, one or more levels of security may be administered based upon the user's physical location. It should be appreciated however, that the locations depicted in FIG. 12 are not intended to limit the invention, and other locations and associated security levels are within the scope of the invention, as described below.

There are a number of available procedures and applications which enable a user or administrator to define geographic and other locations. These procedures and applications are further operable to store the defined locations in a database or some other preferred format for later comparison and utilization. For example, some procedures and applications allow a user to rely upon hardware and software applications to define various boundaries of a geographic location, as described above. The locations may be defined in a preferred format such as by using longitude/latitude information, Cartesian coordinates, polar coordinates, or some other coordinate system. Certain mapping devices allow a user to map a location using the device(s) which saves the mapped location in a readable/downloadable format. The geographic location information may be stored in a database or some other data structure for use in location-based security access.

According to embodiments of the invention, different levels of security are established for a particular user based on the user's physical location. The levels of security and associated access rules are typically implemented using both hardware and software, such as one or more computers, one or more networks, and associated software modules or applications. The security rules and location information may be implemented as part of a computer program and executed by a computer or other computing device to provide levels of security based upon the user's location and/or access request. It will be appreciated that the access request can be performed by using an input device, such as a microphone, keyboard, touchpad, palm, or other input device operable to input information. It will also be appreciated that the levels of security and access rules may be implemented solely using software instructions.

According to one embodiment of the invention, an administrator preferably maintains and administers levels of security according to a particular set of circumstances. For example, the administrator may implement one level of security for situations in which a user is working from the home location 700 and wishes to access a document or application from his home computer. For this situation, the administrator may be the home computer owner, who enlists authentication protocols to prevent unauthorized access to a document or application or to the computer itself. The administrator may predefine location-based security rules 714. For example, the administrator may require a user to enter a proper secure identification (ID) or password to access a document or an application. As described below, the administrator or user may implement any number of security rules or combination of security rules based upon the user's location and the access request.

Another level of security may be implemented when the user wishes to access the same document or application from the office location 702. Yet other levels of security may be implemented when the user would like to access the document or application from another location, such as those depicted in FIG. 12 and others. The levels of security can be enforced when a user attempts to access a device, network, system, application, transaction, and/or content, etc. from some physical location. It will be appreciated that the levels of security can be implemented in other circumstances as well.

As shown in FIG. 12, based on the user's physical location 700, 702, 704, 706, 708, 710, and 712 and the associated access request 716, manipulation of the security rules 714 typically will result in a denied result 718 or successful access 720 to the object or information of interest. According to embodiments of the invention, a denied result 718 may entail providing another opportunity to the user to provide requisite access information. Likewise, successful access 720 may require passage of an additional level of security provided by the security rules 714 before allowing a user access according the access request 716, etc. It will be appreciated that many permutations and combinations exist based on the level of security implemented by the administrator or user according to the physical location of a user and the associated access request 716.

Figure 13:
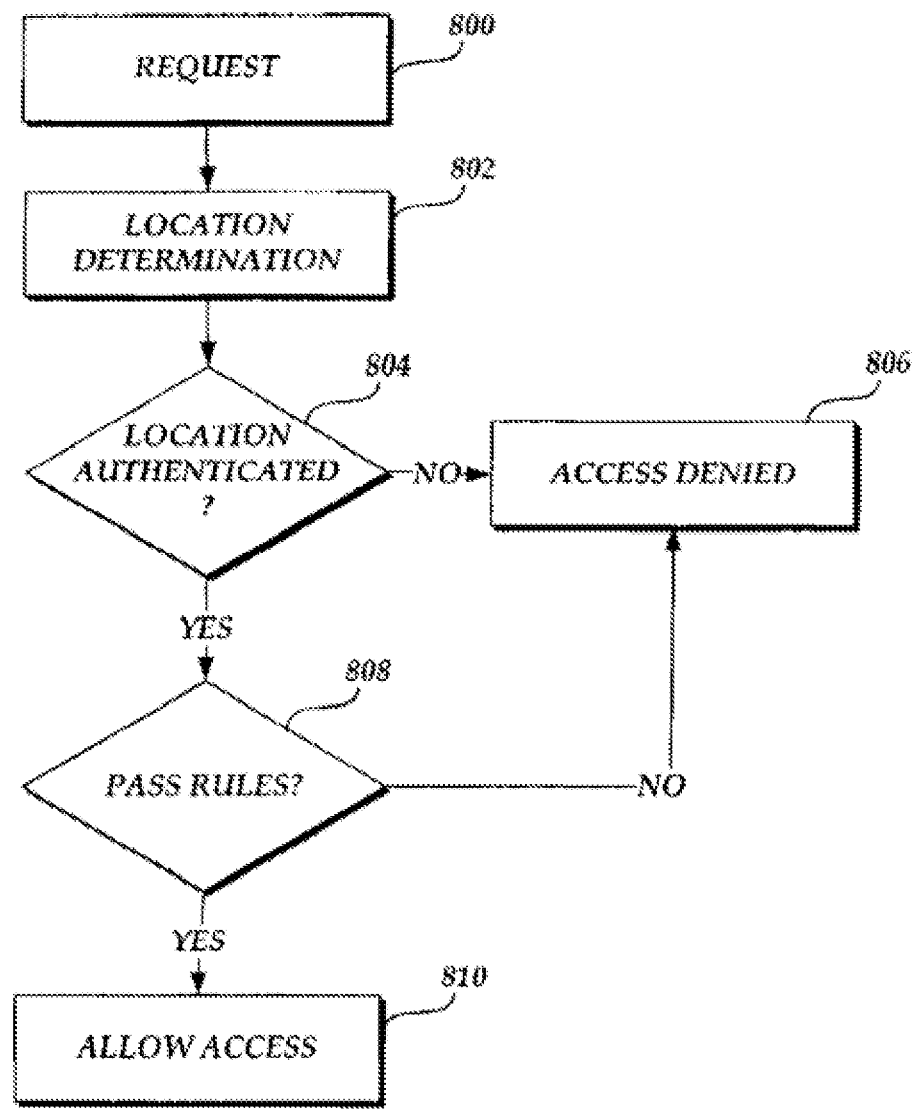
FIG. 13 is a flowchart illustrating an embodiment of the present invention.

With additional reference to FIG. 13, a functional flow diagram depicts an embodiment of the invention. At 800, a user would like access to information of a device, network, system, application, transaction, and/or content, or some other system. Alternatively, at 800, the user may want to access the device, network, system, application, transaction, and/or content, or some other system without necessarily requesting information contained therein. For example, the user may just want to peruse files of an office network without actually downloading any content of the network. As described above, depending on the security rules 714 and the user's physical location, various requirements must be met before the user is allowed access.

At 802, the physical location of the user is determined. As described above, there are a number of location information generating devices, systems, and methods. For this embodiment, the user's location is determined using one or more of the number of location information generating devices, systems, and methods described above for providing a user's location. Since there are situations where the location information may not be reliable, at 804 the user's location is preferably authenticated for certain situations.

The authentification may be performed by a GPS device, cellular location server, or other authenticated location system. In certain circumstances, it is preferred to authenticate the user's location before allowing the user to proceed with the request. At 806, if the user's location cannot be authenticated, the access request 716 is denied. According to alternative embodiments of the invention, location authentication may only be required for scenarios requiring a relatively high level of security based on an access request 716. If the user's location is authenticated, at 808, various security rules 714 are implemented before providing access to the information based on the access request 716. If the user cannot pass the security rules 714, access is denied at 806. If the user passes the security rules 714, information is presented to the user based on the access request 716 at 810.

For example, suppose a user is at the home location 700 and wishes to access information or content from an office server. At 802, the user's location is determined to be the user's home location 700. At 804, the user's home location 700 is authenticated using a cellular location server, for example, which verifies the user's home location 700. Since the user is attempting to access information from the office server while at home, certain security rules 714 may be implemented to prevent access by unauthorized individuals. For example, the user may be required to enter a username and a password before the security rules 714 allow access to the information. If the user does not enter the proper username and password, access is denied at 806. If the user provides the proper username and password, at 810 the user is allowed to access the information.

Again, it will be appreciated that the different security rules 714 may be implemented according to the user's location and/or access request 716. For example, a different set of rules 714 may be implemented if the user is attempting to access a document from a local computer drive. As another example, a different set of rules 714 may be implemented when a user attempts to access confidential information from an office server while at home. Not only should the user's location be authenticated using an authentification device, such as a cellular location server or GPS authentification system, but the user should also be required to pass another level of security, such as providing a secure password as well as a secure ID. The additional security corresponds to the confidential nature of the information sought by the user.

At 808, the user is allowed access by providing the proper response according to the security rules 714. As discussed above, different security rules 714 can be implemented based upon the user's location and the access request 716. For the home user, after verifying the user's home location 700, certain security rules 714 must be passed before allowing access based on the user's home location 700 and the access request 716. Continuing the example, since the user is attempting to access information from the office server while located at his/her home, the user is required, based on the security rules 714, to provide an account number and a secure identification (ID), for example. If the user was only attempting to view files located on the office server from home, the rules 714 may only require an account number, for example.

As another example, suppose the user is at the office location 702 and wishes to access an application from the office server at 800. At 802, the user's office location 702 is determined using one or more of the location information methods and systems described herein. At 804, the user's office location 702 may be authenticated using one or more of the location authentication methods and systems. For example, the user's office location 702 authentication may be performed by a GPS device.

At 806, the user is required to input a valid corporate identification (ID) and/or password according the security rules 714 implemented for accessing the application from the office server while located in the office. If the user inputs the proper corporate ID and/or password, the user is allowed to access the application at 810. If the user does not input the proper corporate ID and/or password, the security rules 714 may allow the user one or more attempts, otherwise the user is denied access to the application at 806 and the administrator may be notified of the access attempt. An e-mail or other electronic message may be automatically transmitted to the administrator alerting him/her of the denied access attempt(s).

As yet another example of the location-based security rules 714, suppose a user wishes to access a corporate network from within a resident country 708, such as the United States. Different security rules 714 may be implemented according to whether the user is located within a certain state 706 or county 704 associated with the resident country. For this example, security rules 714 are implemented based upon a user wishing to gain access to a corporate network from within the user's resident country 708.

At 802, the user's location is determined using one or more of the location information methods and systems described above. At 804, the user's location may be authenticated to verify that the user is indeed within the United States. If location authentification fails, access is denied at 718. For this example, the user's location authentication is preferably performed by a location authentication system, such as an authentication network. If the user's location is authenticated, at 806, the user is required to input a valid corporate ID and/or a biometric identifier.

There are many different types of biometric identification mechanisms available, such as iris scanning applications, face recognition applications, voice recognition applications, hand/finger recognition applications, fingerprint recognition applications, RFID tags, smartcard applications, and others. Biometric identification entails comparing a characteristic associated with a user, which is inherently personal in nature, to a digital or other representation of the same characteristic.

If the user inputs the proper corporate ID and biometric identifier, he/she is allowed to access the corporate network at 810, for example.

Additionally, due the nature of the access, an administrator may also implement encryption procedures once the user has successfully accessed the corporate network. If the user does not input the proper corporate ID and biometric identifier, the security rules may direct the user to a corporate spy trap or tracking application. The security rules may also notify the administrator of the failed access attempt. The biometric identifiers may be used according to the access request and/or access location. For certain embodiments, it is preferable to use biometric identifiers when the access request 716 and/or location require a high level of security.

There are other situations where a user may always be denied access due to their location. For example, suppose a user is located at a restricted location 712, such as a foreign country or other location. Once the user's location is determined at 802, the security rules 714 provide no mechanism for accommodating an access request 716. A restricted location 712 may also encompass a "Red Zone" which is a defined a dangerous area or an area where information should be protected and not compromised under any circumstances. If the user is determined to be with in a Red Zone, the device or system may undertake an evasive action, such as erasing all memory locations, encrypting information contained within the device or system, and/or severing the power or functionality associated with the device or system.

Referring now to FIG. 14, a functional block diagram for location-based security 900, according to an embodiment of the invention is shown. Table 2 below depicts various rules 904, according to this embodiment of the invention. The rules 904 may be stored in a database as part of an application server 905 in a networked computing environment, described above.

matic trigger or manual trigger initiated by the user, such as turning ON the computer, opening an application, opening a file, requesting content, accessing internet, accessing corporate LAN, utilizing specific computer ports (USB, Firewire, radio ports), activating an accessory (any attachments on the device, video camera, microphone, electronic probe, etc.), and/or changes in location.

For example, location-based security 900 may be implemented for certain local operations when not connected to a network system, such as when a user attempts to access an application/document from a personal computer or other device. Preferably, the operating system itself, an associated application, or database includes the rules 904. A security control server 906 uses the rules 904 locally or remotely. The personal computer or device, utilizing the rules 904, monitors the access event and based on the location, requires certain access information. It will be appreciated that the various servers described herein can comprise a single unit or device, or the various servers can be co-located or located at various locations. Furthermore, communication between the various components described herein can be accomplished in a variety of ways including, wireless, wireline, and combinations thereof.

For scenarios where the user is connected to a networked system, local and/or remote monitoring of access requests and location is possible. That is, events are monitored through either the local system or a remote system, or a combination, such as location server 908, when connected to a data network, for example. Accordingly, location information may be provided by a local location system (e.g., GPS) or a network based system (e.g., cellular location server). As an example, suppose a user is using a wireless personal data assistant (PDA) to access a sensitive local application. Location-based security 900, utilizes security control server 906, utilizing the application running on the PDA or on a networked server,

TABLE 2

| Location | Action (user or system) | User or Acct # | Location system verification | Authentication requirements | Security Enablement Action | Security Failure Action |
|---|---|---|---|---|---|---|
| Office | Accessing an Application | Name | Device GPS | Password | Allow full access | 3 tries then shut down device and notify admin |
| Home | Accessing Content | Acct number | Cellular location server | Secure ID | Show content | Block content |
| US location | Accessing corporate network or a foreign network | Corporate ID | Authenticated location system only | Biometric | Access to corporate network, turn on encryption | Access to corporate spy trap. Report to IT admin. |
| Restricted location | Computer turned ON | No information needed | No authentication required | None required | None | Computer performs "stolen routine" |

As shown in FIG. 4, a user (alternatively a computing device, system, etc.) performs some action at a location, which according to this embodiment necessitates location-based security 900. Location-based security 900 includes various rules (see Table 2) 904, security control server 906, location server 908, security verification 910, authentication 912, positive authentication rules 914, security enablement actions 916, security failure actions 918, and negative authentication rules 920. Example actions may include, an auto-such as server 906. The application checks to see if it could contact an enterprise security server or remote server. This request includes information on the location of the PDA through the cellular network location server 908 or a local server. The response from the enterprise security server, such as server 906, determines what information the application would need to allow the user to access based on this location.

When the device, such as PDA or other computing system, connects to a remote application server 905, a location based security server 908, which may comprise the same server, would monitor the interaction between the device and the application server 905. The remote application server 905, upon encountering a security trigger, requests location information pertaining to the device. Based on the location and the action, the remote application server 905 applied location based security rules 904. The rules 904 preferably include the procedures to be followed based upon the action, location, and/or the quality of the location source (i.e. accuracy, authentication).

Additionally, the rules 904 define the information, parameters, and elements necessary for the security verification 910. This would include: user profile, location, location system verification (i.e., the source of the location information and authentication of the information), actions that trigger security control, access requirements (may involve authenticating the user or verifying that this person should be capable of this action). Security enablement is based on successful processing of security rules 904 and what is required in order for this action to take place (e.g. what programs need to be accessed and what other measures need to take place given the user, location and action, such as, activate encryption for the link, upgrade to high speed link, start billing, download program, etc). Conversely, if the security control fails, the actions which should follow.

For example, suppose a user using a wireless PDA accesses a corporate database to determine product pricing information. Location-based security 900 is alerted to the remote device trying to access sensitive corporate database and requests location information from PDA. PDA provides location delivery request to mobile location server, such as server 908, which sends location information to location-based security 900. Location-based security 900 queries security rules 904 based on account type, etc. and application server 905 utilizes location information to determine allowable access. If the query results specify no access, location-based security 900 denies access to the corporate database.

It should be appreciated that numerous permutations and combinations of the security rules based on a user's location may be implemented. For example, a user access request 716 may include turning a device or system "on", requesting an application locally or remotely, requesting content or information locally or remotely, requesting internet access locally or remotely, requesting corporate network access locally or remotely, requesting access to a device or system port (i.e. USB, fireware, radio ports, etc.), and/or attempting to connect an accessory to the device or system (i.e. digital or video camera, microphone, electronic probe, etc.) Additionally, if a user properly accesses a device, application, system, etc. based on the user's location, certain functionality may be available while other functions may not. For example, after properly accessing an application, based on the user's profile, only read or write functionality may be available, while preventing the user from copy and other modifying functions. These are just a few examples of the present invention, and those skilled in the art will appreciate the many different application which can be implemented based on the description above.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A computer-implemented method, for providing secure access control in connection with a requested resource, based on a characteristic of a request to access the resource, location information for a mobile communication device associated with the request, and a quality of the location information, comprising:
    receiving, at a tangible, non-transitory computing component, the request to access the resource from a user associated with the mobile communication device;
    determining, at the tangible, non-transitory computing component, that a security trigger has occurred;
    in response to determining that the security trigger has occurred, the tangible, non-transitory computing component requesting the location information for the mobile communication device associated with the request;
    receiving, at the tangible, non-transitory computing component, the location information for the mobile communication device associated with the request;
    determining a quality of a location source providing the location information;
    in response to (a) receiving the request, (b) determining that the security trigger has occurred, and (c) receiving the location information, the tangible, non-transitory computing component determining a pre-established access rule, the determining the pre-established access rule including identifying the pre-established access rule based on each of (i) a characteristic of the request to access the resource, (ii) the location information for the mobile communication device associated with the request, and (iii) the quality of the location source providing the location information; and
    executing a pre-determined security action associated with the pre-established rule determined by the tangible, non-transitory computing component.

2. The computer-implemented method of claim 1, the resource comprising at least one of an additional device, an application, a system, content, and a network.

3. The computer-implemented method of claim 1, the pre-established access rule being defined by the user.

4. The computer-implemented method of claim 1, further comprising:
    determining that the location information indicates a location of the mobile communication device, associated with the request, corresponding to a restricted location;
    wherein, in response to determining that the location associated with the request corresponds to the restricted location, the executing the pre-determined security action associated with the pre-established rule determined by the tangible, non-transitory computing component includes denying the request.

5. The computer-implemented method of claim 1, the executing comprising using at least one of a biometric identification application, a radio-frequency identification tag application, and a smartcard application to verify the request in response to a determination that the location information indicates that a location of the mobile communication device that requires a high level of security.

6. The computer-implemented method of claim 1, the quality of the location source relating to a certain accuracy of the location information.

7. The computer-implemented method of claim 1, the quality of the location source relating to an authentication process performed in connection with the location information received.

8. The computer-implemented method of claim 1, the pre-determined security action executed (A) allowing access by the user to certain functionality associated with the resource requested while (B) disallowing access by the user to other functionality associated with the resource requested.

9. The computer-implemented method of claim 1, the determining the pre-established access rule further including, in identifying the pre-established rule based on the characteristic of the request to access the resource, identifying the pre-established rule based on content of data sought by the request.

10. The computer-implemented method of claim 1, further comprising:
determining that the location information indicates a location of the mobile communication device, associated with the request, corresponding to a restricted location;
wherein, in response to determining that the location associated with the request corresponds to the restricted location, the executing the pre-determined security action associated with the pre-established rule determined by the tangible, non-transitory computing component includes undertaking an evasive action including at least one of:
erasing a memory location;
encrypting data contained within the mobile communication device;
encrypting data contained within a system associated with the resource;
severing power associated with the mobile communication device;
severing power associated with the system associated with the resource;
severing a functionality of the mobile communication device; and
severing a functionality of the system associated with the resource.

11. A tangible, non-transitory computer-readable storage medium, for providing secure access control in connection with a requested resource, based on a characteristic of a request to access the resource, location information for a mobile communication device associated with the request, and a quality of the location information, comprising instructions that, when executed by a processor, cause the processor to perform acts including:
receiving the request to access the resource from a user associated with the mobile communication device;
determining that a security trigger has occurred;
in response to determining that the security trigger has occurred, requesting the location information for the mobile communication device associated with the request;
receiving the location information for the mobile communication device associated with the request;
determining a quality of a location source providing the location information;
in response to (a) receiving the request, (b) determining that the security trigger has occurred, and (c) receiving the location information, determining a pre-established access rule, the determining the pre-established access rule including identifying the pre-established access rule based on each of (i) a characteristic of the request to access the resource, (ii) the location information for the mobile communication device associated with the request, and (iii) the quality of the location source providing the location information; and
executing a pre-determined security action associated with the pre-established rule.

12. The tangible, non-transitory computer-readable storage medium of claim 11, the instructions being configured to further cause the processor to:
determine that the location information indicates a location of the mobile communication device, associated with the request, corresponding to a restricted location;
wherein, in response to determining that the location associated with the request corresponds to the restricted location, the executing the pre-determined security action associated with the pre-established rule includes denying the request.

13. The tangible, non-transitory computer-readable storage medium of claim 11, the instructions being configured to further cause the processor to, in executing the pre-determined security action, use at least one of a biometric identification application, a radio-frequency identification tag application, and a smartcard application to verify the access request when the comparison yields a location that requires a high level of security.

14. The tangible, non-transitory computer-readable storage medium of claim 11, the quality of the location source relating to a certain accuracy of the location information.

15. The tangible, non-transitory computer-readable storage medium of claim 11, the quality of the location source relating to an authentication process performed in connection with the location information received.

16. The tangible, non-transitory computer-readable storage medium of claim 11, the pre-determined security action executed (A) allowing access by the user to certain functionality associated with the resource requested while (B) disallowing access by the user to other functionality associated with the resource requested.

17. The tangible, non-transitory computer-readable storage medium of claim 11, the instructions being configured to further cause the processor to, in identifying the pre-established rule based on the characteristic of the request to access the resource, identify the pre-established rule based on content of data sought by the request.

18. The tangible, non-transitory computer-readable storage medium of claim 11, the instructions being configured to further cause the processor to:
determine that the location information indicates a location of the mobile communication device, associated with the request, corresponding to a restricted location;
wherein, in response to determining that the location associated with the request corresponds to the restricted location, and in the executing the pre-determined security action associated with the pre-established rule, undertake an evasive action includes at least one of:
erasing a memory location;
encrypting data contained within the mobile communication device;
encrypting data contained within a system associated with the resource;
severing power associated with the mobile communication device;
severing power associated with the system associated with the resource;
severing a functionality of the mobile communication device; and
severing a functionality of the system associated with the resource.

* * * * *